(12) United States Patent
Gaebelein et al.

(10) Patent No.: US 10,307,864 B2
(45) Date of Patent: Jun. 4, 2019

(54) METHODS AND SYSTEMS TO KEEP A WORK PIECE SURFACE FREE FROM LIQUID ACCUMULATION WHILE PERFORMING LIQUID-JET GUIDED LASER BASED MATERIAL PROCESSING

(71) Applicant: Avonisys AG, Zug (CH)

(72) Inventors: Jens Guenter Gaebelein, Freienfeld (IT); Jeroen Hribar, Lucerne (CH)

(73) Assignee: Avonisys AG, Zug (CH)

( * ) Notice: Subject to any disclaimer, the term of this patent is extended or adjusted under 35 U.S.C. 154(b) by 513 days.

(21) Appl. No.: 14/535,341

(22) Filed: Nov. 7, 2014

(65) Prior Publication Data

US 2015/0165553 A1 Jun. 18, 2015

Related U.S. Application Data

(60) Provisional application No. 61/915,510, filed on Dec. 13, 2013.

(51) Int. Cl.
*B22D 19/00* (2006.01)
*B23K 26/06* (2014.01)
*B23K 26/14* (2014.01)
*B23K 26/38* (2014.01)
*B23P 17/02* (2006.01)
(Continued)

(52) U.S. Cl.
CPC ........ *B23K 26/146* (2015.10); *B22D 19/0072* (2013.01); *B23K 26/0608* (2013.01); *B23K 26/0648* (2013.01); *B23K 26/142* (2015.10); *B23K 26/1462* (2015.10); *B23K 26/1464* (2013.01); *B23K 26/1482* (2013.01); *B23K 26/38* (2013.01); *B23P 17/02* (2013.01); *B29C 33/10* (2013.01); *B29C 33/3842* (2013.01); *B29D 30/0606* (2013.01); *B29D 30/0629* (2013.01); *B23K 2103/16* (2018.08); *B23P 19/047* (2013.01); *B29D 2030/062* (2013.01); *B29D 2030/0613* (2013.01); *B29D 2030/0617* (2013.01); *B33Y 10/00* (2014.12); *B33Y 80/00* (2014.12); *Y10T 29/49721* (2015.01); *Y10T 29/49995* (2015.01); *Y10T 29/49996* (2015.01)

(58) Field of Classification Search
CPC ................ B23K 26/14; B23K 26/1417; B23K 26/1405; B23K 26/1458; B23K 26/1464
See application file for complete search history.

(56) References Cited

U.S. PATENT DOCUMENTS 5,424,508 A * 6/1995 Swain et al. ............. 219/121.84
5,496,985 A * 3/1996 Foltz et al. ............... 219/121.67
(Continued)

FOREIGN PATENT DOCUMENTS

JP 2009291807 A * 12/2009

OTHER PUBLICATIONS

Machine translation of JP2009291807 of Maehara et al.*

*Primary Examiner* — Thien S Tran
(74) *Attorney, Agent, or Firm* — Patent2ip LLC; Tue Nguyen

(57) ABSTRACT

A gas flow can be provided together with a liquid jet guided laser beam to remove accumulated liquid on the processing surface. The gas flow can have minimum interference with the liquid jet guided laser beam, while functions to blow away liquid generated by the liquid jet. Keeping the surface free from accumulated liquid can improve the efficiency of the liquid jet guided laser processing.

20 Claims, 19 Drawing Sheets

(51) Int. Cl.
  *B23P 19/04* (2006.01)
  *B29C 33/10* (2006.01)
  *B29C 33/38* (2006.01)
  *B29D 30/06* (2006.01)
  *B33Y 10/00* (2015.01)
  *B33Y 80/00* (2015.01)
  *B23K 103/16* (2006.01)
  *B23K 26/142* (2014.01)
  *B23K 26/146* (2014.01)

(56) References Cited

U.S. PATENT DOCUMENTS

2001/0004480 A1* 6/2001 Mueller et al. ............... 427/554
2010/0213166 A1* 8/2010 Kray et al. ...................... 216/37

* cited by examiner

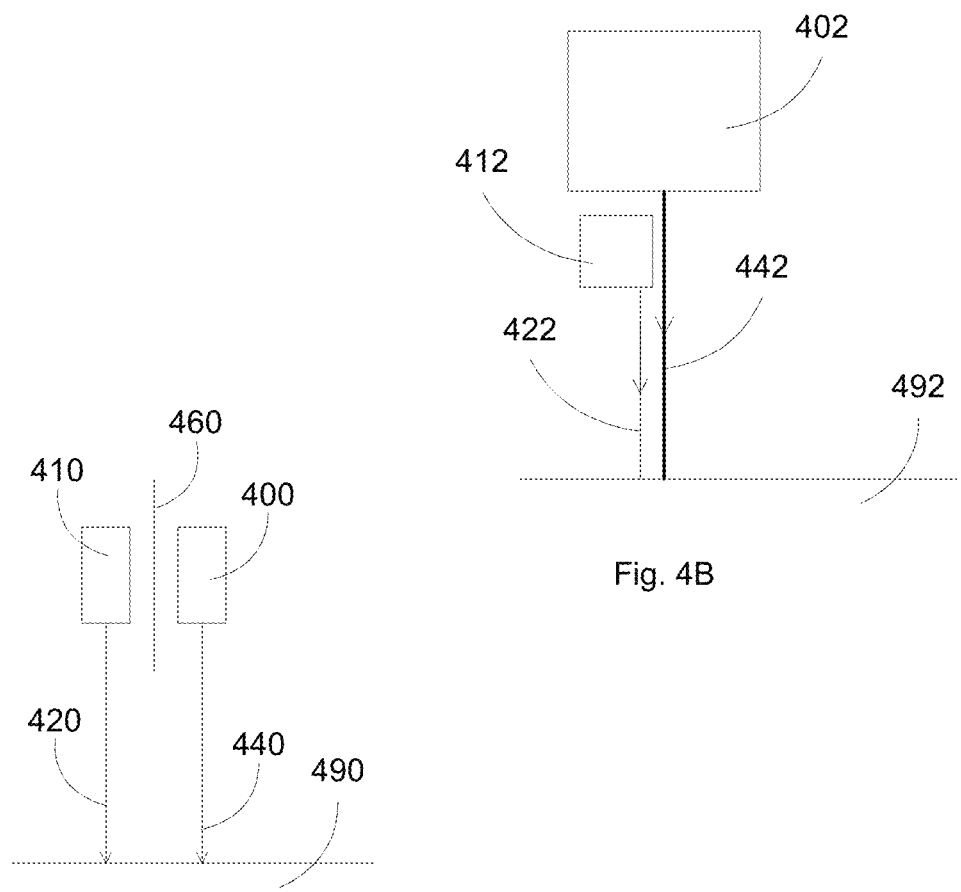
Fig. 4A
Fig. 4B
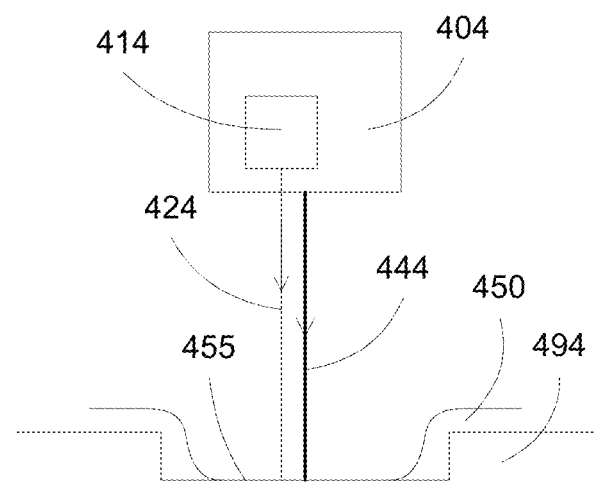
Fig. 4C

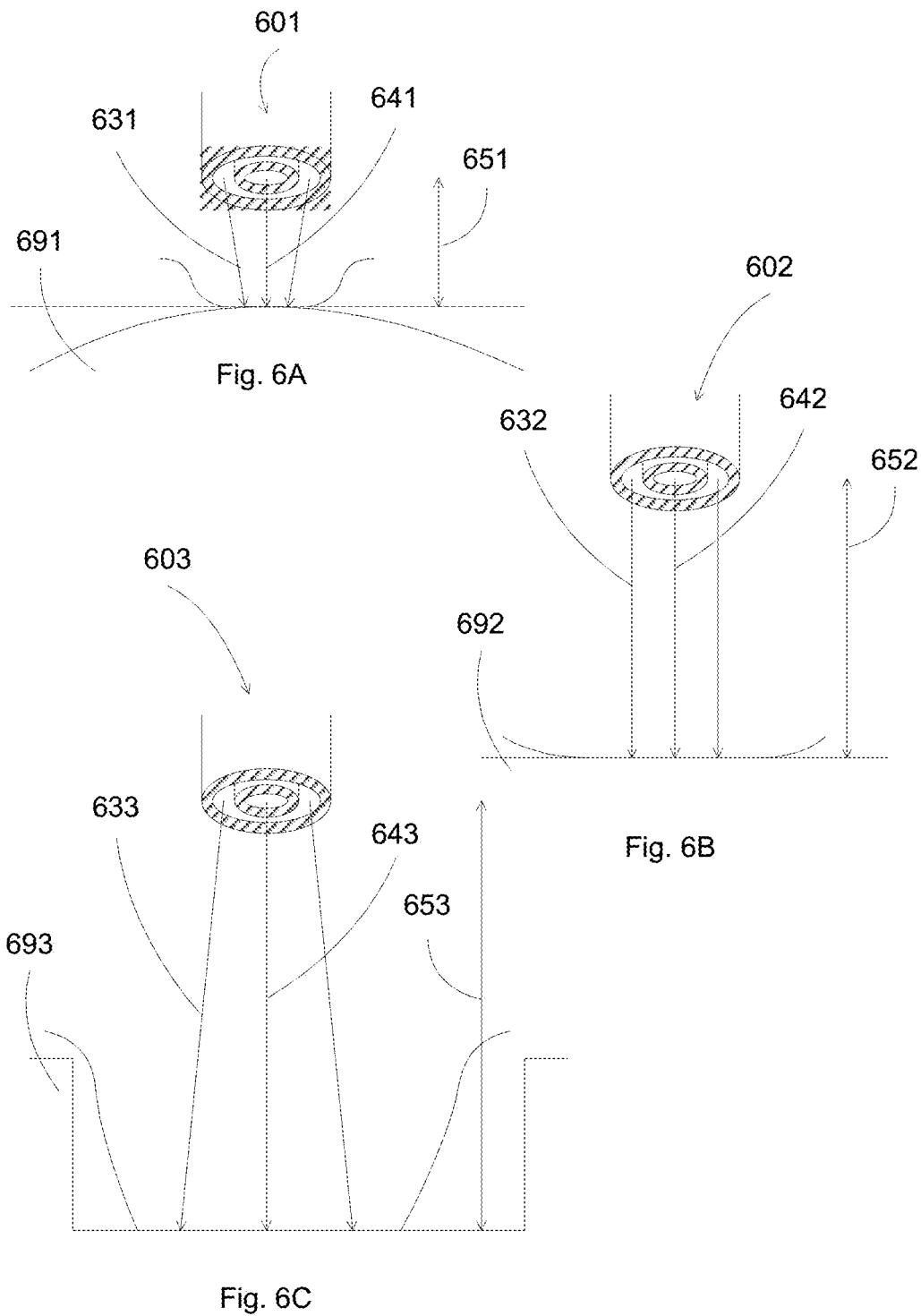

Providing a laser beam embedded in a liquid jet, wherein the liquid jet contacts an object surface
700

Flowing an air jet to the object surface, wherein the air jet does not affect the liquid jet, wherein the air jet is independent with the liquid jet, wherein the gas flow blows liquid away from the object surface
710

Fig. 7A

Emitting a laser beam toward an object surface, wherein the laser beam is guided by a liquid jet
730

Flowing an air jet surrounding the liquid jet, wherein a portion of the parallel run of the air jet and liquid jet is separated by a physical separation, wherein the air jet blows liquid away from the object surface
740

Fig. 7B

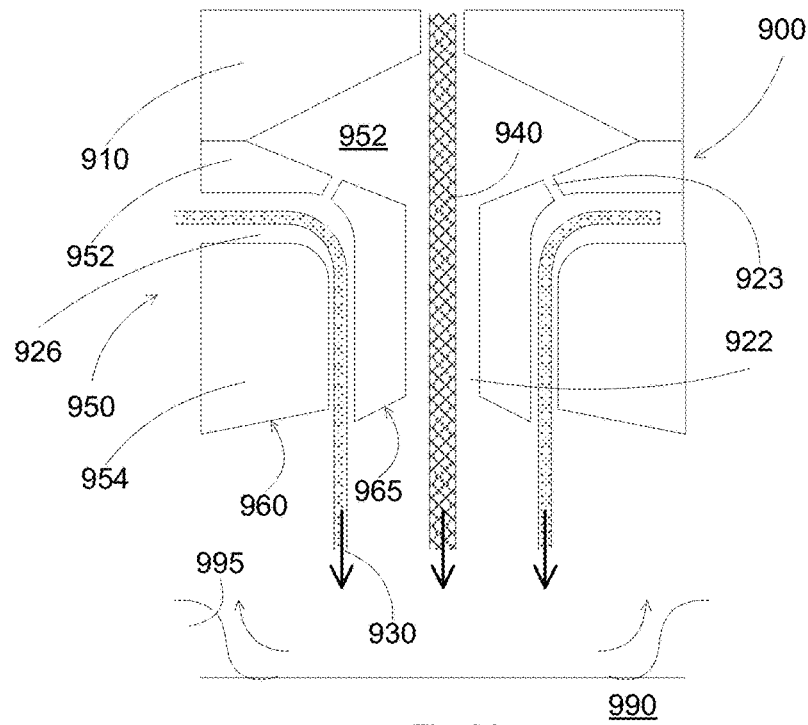
Fig. 9A
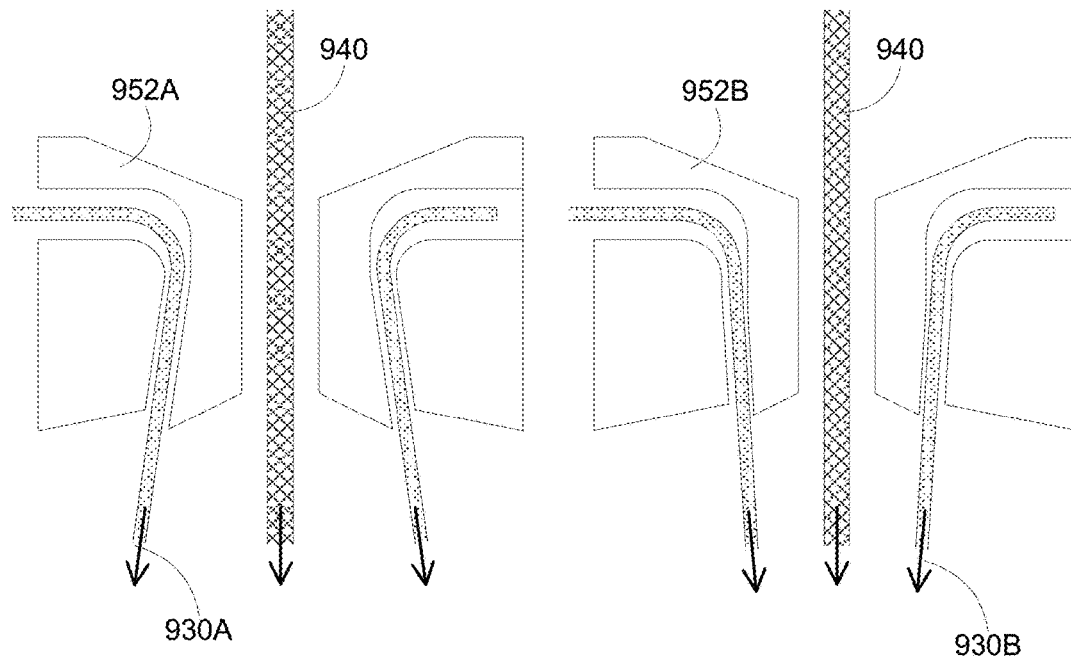
Fig. 9B
Fig. 9C

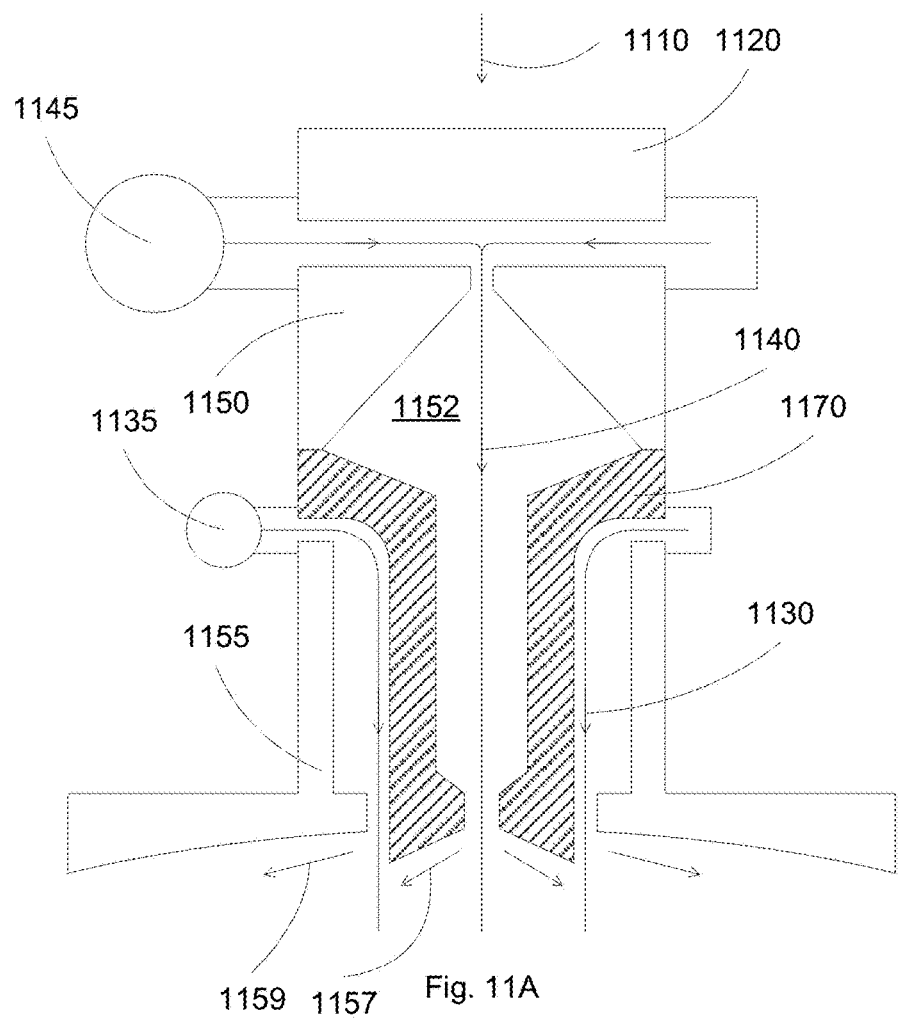
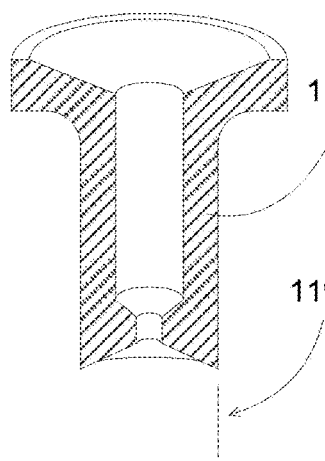 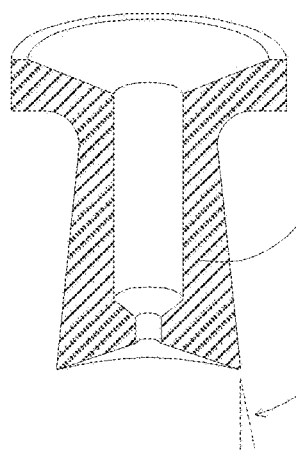 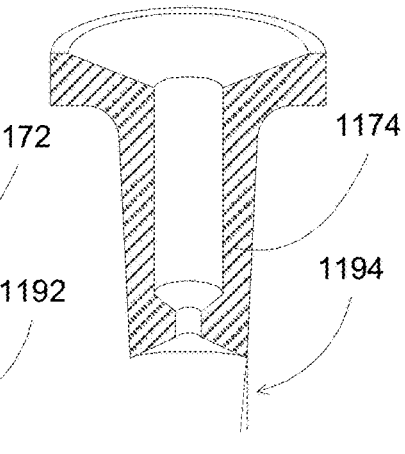
Fig. 11A
Fig. 11B    Fig. 11C    Fig. 11D Supplying liquid to a nozzle module to form a liquid jet, wherein the liquid jet is configured to pass through a first conduit formed by an inner wall of an air jet module
1200

Focusing a laser beam to form internal reflection in at least a portion of the liquid jet
1210

Supplying a gas flow to form an air jet in a second conduit, wherein the second conduit is formed between the inner wall and an outer wall of the air jet module, wherein the air jet is configured to surround the liquid jet, wherein the air jet and the liquid jet are guided toward a workpiece
1220

Fig. 12

Supplying liquid to a nozzle to form a liquid jet, wherein the liquid jet is configured to pass through a first conduit inside an air jet nozzle
1300

Focusing a laser beam to form internal reflection in at least a portion of the liquid jet
1310

Supplying a gas flow to a second conduit between an outside of the air jet nozzle and an inside of an air jet nozzle holder to form an air jet, wherein the air jet is configured to surround the liquid jet, wherein the air jet nozzle is configured to shield the liquid jet from the air jet, wherein the air jet and the liquid jet are guided toward a workpiece
1320

Fig. 13

Flowing a liquid to a coupling unit to form a liquid jet
1600

Focusing a laser beam onto the liquid jet, wherein the laser beam is guided by the liquid jet
1610

Forming a gas flow running parallel to the liquid jet, wherein the gas flow is separate from the liquid jet by a solid partition, wherein the gas flow is configured to clear a surface that the liquid jet is to be contacted
1620

Fig. 16A

Providing an insert to a coupling unit, wherein the coupling unit is operable for forming a liquid jet
1630

Forming a laser beam guided by the liquid jet
1640

Forming a gas flow running parallel to the liquid jet, wherein the gas flow is separate from the liquid jet by the insert
1650

Fig. 16B

```
┌─────────────────────────────────────────────┐
│  Flowing a liquid to a cavity area, wherein the liquid │
│  exits from the cavity in a form of a liquid jet, wherein │
│         the liquid jet contains a laser beam         │
│                        1900                          │
└─────────────────────────────────────────────┘
                         ↓
┌─────────────────────────────────────────────┐
│   Equalizing the pressure in the cavity by a fluid   │
│  passage way between the cavity and a gas flow       │
│                      pathway                         │
│                        1910                          │
└─────────────────────────────────────────────┘
```

Fig. 19A

```
┌─────────────────────────────────────────────┐
│  Providing an insert to a coupling unit, wherein the │
│   coupling unit is operable for forming a liquid jet │
│                        1930                          │
└─────────────────────────────────────────────┘
                         ↓
┌─────────────────────────────────────────────┐
│      Forming a laser beam guided by the liquid jet   │
│                        1940                          │
└─────────────────────────────────────────────┘
                         ↓
┌─────────────────────────────────────────────┐
│  Forming a gas flow running parallel to the liquid jet, │
│   wherein the gas flow is separate from the liquid jet  │
│                      by the insert                     │
│                         1950                           │
└─────────────────────────────────────────────┘
                         ↓
┌─────────────────────────────────────────────┐
│   Equalizing the pressure in the coupling unit by a  │
│   fluid passage way between the coupling unit and the │
│                   gas flow pathway                    │
│                        1960                           │
└─────────────────────────────────────────────┘
```

Fig. 19B

METHODS AND SYSTEMS TO KEEP A WORK PIECE SURFACE FREE FROM LIQUID ACCUMULATION WHILE PERFORMING LIQUID-JET GUIDED LASER BASED MATERIAL PROCESSING

This present application claims priority from U.S. Provisional Patent Application Ser. No. 61/915,510, filed on Dec. 13, 2013, entitled: "Methods and systems to keep a work piece surface free from liquid accumulation while performing liquid-jet guided laser based material processing" which is incorporated herein by reference.

BACKGROUND

Laser technology is applied for a large variety of material processing tasks, such as cutting, drilling, welding, marking, engraving and material ablation. Nearly all materials can be processed, e.g. metals, metal alloys, ceramics, diamonds, synthetic diamonds, carbon fibres, sapphire, quartz, glass, plastics and more. In almost every case, the laser light is focused into a very small spot onto the work piece using a focusing lens, to enable the processing task by generating sufficient energy on the work piece. The work piece therefore has to be precisely aligned into the laser focus throughout the processing task.

Liquid-jet guided laser technology, as for example described in patent EP 1940579B1 and U.S. Pat. No. 8,859,988B1, couples the laser focus into a small liquid-jet, for example, through a focusing lens. This coupling takes place in a coupling unit. The coupling unit can include a metal chamber that on the side of the focusing lens is closed with a laser protection window. On the opposite side the chamber carries a nozzle. Liquid provided to the coupling unit flows between window and nozzle and leaves the nozzle in form of a liquid-jet. The energy of the laser spot in the focal plane is captured inside the liquid-jet and guided to the work piece through internal reflection. This method eliminates the necessity to control the distance of the work piece precisely because the required energy to perform the processing is available throughout the laminar length of the liquid-jet. Any liquid that provides suitable light guide capabilities can be used to form the liquid-jet.

To increase the laminar length of the liquid-jet, and with that the working distance of the process, an assist gas can be provided to the liquid-jet as described in patent EP 1940579B1 or patent EP 1833636B1. The assist gas is provided and guided as a direct boundary layer to the liquid-jet in order to reduce the resistance between liquid and ambient air and thereby increase the laminar length of the liquid-jet. Thus the liquid jet is surrounded by the assist gas to leave the coupling unit through the same exit opening. Inside the coupling unit, the assist gas is directed perpendicular to the liquid jet. For example, the assist gas is in the horizontal plane hitting the liquid-jet that is travelling in the vertical plane. The assist gas and the liquid jet then leave the system at a same exit hole, with the liquid jet in the middle surrounded by the assist gas.

FIG. 1 illustrates a prior art liquid jet guided laser beam system having an assist gas configuration. A liquid jet guided laser beam system 100 can include a coupling unit 130 having a nozzle 135. A liquid, such as water 120, can be provided to the nozzle 135, and travel through the hole of the coupling unit to form a liquid jet 140 in a chamber 160. A laser beam 110 can be focused, for example, by a lens 115, to the liquid jet 140. Internal reflection can limit the laser beam to be within the liquid jet. The liquid jet guided laser beam can flow toward an object surface 190, where the laser can cut through the object by means of material ablation in a single or multiple passes.

An assist gas 150 can be provided to a cavity 160 of the coupling unit 130. The assist gas 150 can flow 155 in a direction perpendicular to the liquid jet 140, but do not intersect the liquid jet. The assist gas 155 can envelop the liquid jet, reducing the friction of the liquid jet to the air ambient, and potentially extending the laminar length of the liquid jet. The properties of the assist gas can be chosen to optimize the laminar length of the liquid jet, such as low viscosity gas at medium pressure.

Since the assist gas 150 and the liquid jet 140 are mixed in a same chamber 160, there is dependency between the assist gas and the liquid jet. For example, the pressure and flow properties of the assist gas can be selected to optimize the laminar flow of the liquid jet. Other operating conditions of the assist gas can adversely affect the liquid jet. For example, a high pressure of the assist gas can shorten the laminar flow of the liquid jet, and an even higher pressure of the assist gas can destroy the liquid jet.

There is a need for improving the liquid-jet laser technology, for example, to keep a work piece surface free from liquid accumulation while performing liquid-jet guided laser based material processing.

SUMMARY OF THE EMBODIMENTS

In some embodiments, the present invention discloses methods and systems for keeping a surface dry when being processed with a liquid jet guided laser beam. A gas flow can be provided, which surrounds the liquid jet and runs in a same direction as the liquid jet. The gas flow can clear the surface from accumulated liquid, which can improve the efficiency of the liquid jet guided laser processing. The gas flow and the liquid jet can be generated at two separate openings, allowing the independent control of the gas flow characteristics, such as pressure or flow rate.

BRIEF DESCRIPTION OF THE DRAWINGS

FIGS. 4A-4C illustrate a schematic operation of a liquid jet guided laser beam having a air jet according to some embodiments.

FIGS. 6A-6C illustrate different flow directions of the air jet according to some embodiments.

FIGS. 7A-7B illustrate flow charts for running a liquid jet guided laser beam according to some embodiments.

FIGS. 9A-9C illustrates a schematic of different air jets according to some embodiments.

FIGS. 11A-11D illustrate a schematic of a coupling unit for liquid jet guided laser processing according to some embodiments.

FIG. 12 illustrates a flow chart for operating a liquid jet guided laser system according to some embodiments.

FIG. 13 illustrates a flow chart for operating a liquid jet guided laser system according to some embodiments.

FIGS. 16A-16B illustrate flow charts for operating a liquid jet guided laser beam using a air jet according to some embodiments.

FIGS. 19A-19B illustrate flow charts for operating a liquid jet guided laser system according to some embodiments.

DETAILED DESCRIPTION OF THE EMBODIMENTS

Figure 1:
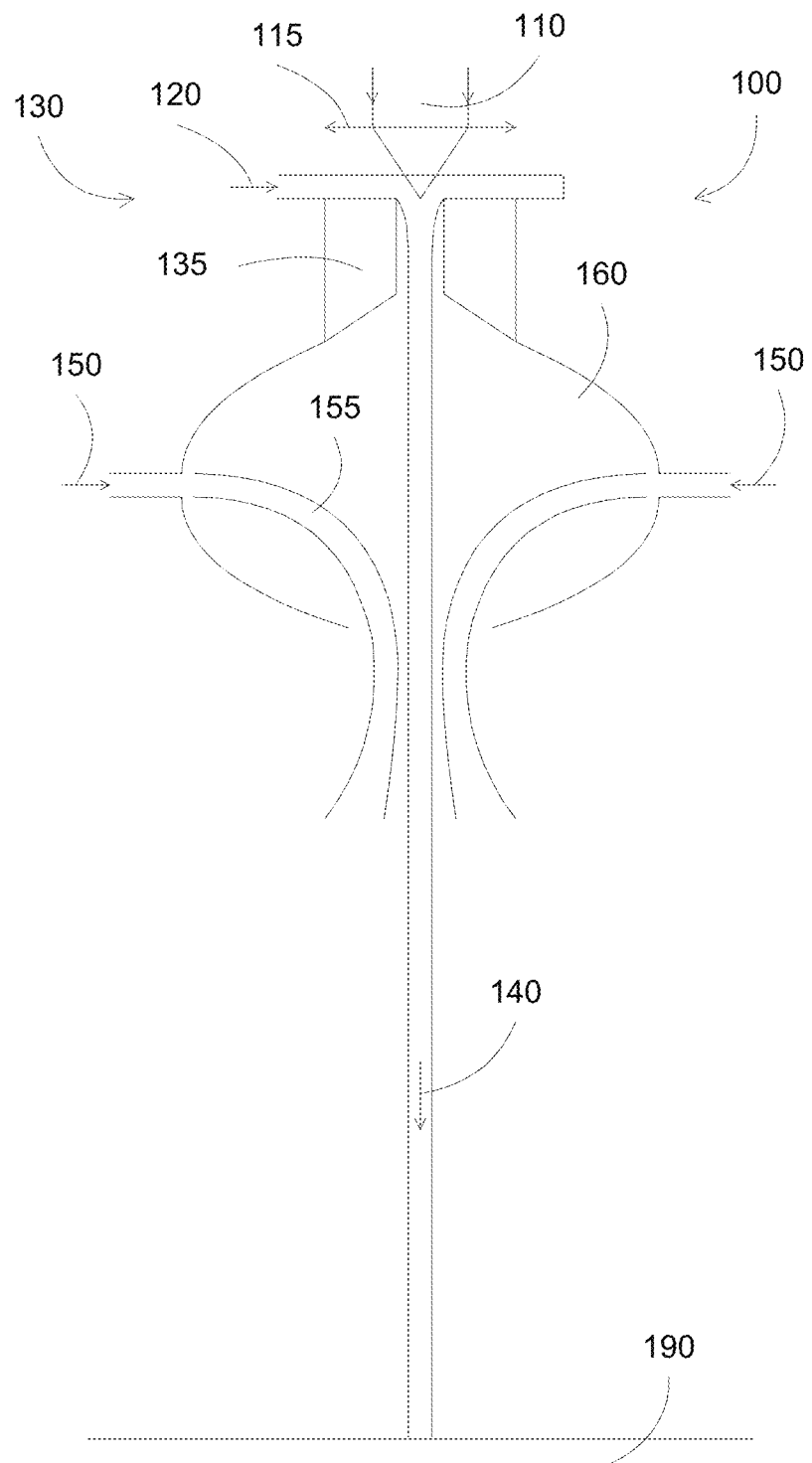
FIG. 1 illustrates a prior art liquid jet guided laser beam system having an assist gas configuration.

In some embodiments, the present invention discloses methods and systems for liquid-jet guided laser beam material processing while keeping the work piece surface free from liquid accumulation. A gas flow can be provided together with the laser beam. The gas flow can be a air jet, which can prepare the surface of the object that the liquid-jet guided laser beam processes. The gas flow can be an air jet, which can be directed toward the working area of the laser beam, and can be operable to reduce the amount of liquid accumulated by the liquid jet at the surface of the work piece. The air jet can be configured to have gas pressure and flow velocity when leaving the gas nozzle to clear the object surface of the fluid, such as driving away the liquid to expose the work piece surface. Further, the air jet can be configured independent of the liquid jet, thus can minimize any interference to the liquid-jet.

In the following description, the term air jet can include a gas flow, such as a flow of air or of any other gases, such as nitrogen, argon, or oxygen. Thus the term "air jet" in the context of the present invention is not limited to a jet of air, but also includes a flow of a gas or a fluid, such as a nitrogen gas flow, or an aerosol flow.

The air jet can be used with liquid jet guided laser beam with or without an assist gas. The air jet can provide functionalities that the assist gas cannot perform. For example, the assist gas cannot clear a concave surface such as a cavity that can hold the liquid. The air jet, since the pressure can be independently adjusted, can clear the work surface from accumulated liquid, e.g., concave or convex surfaces. For example, due to the functionality of the assist gas, which is to increase the laminar length of the liquid jet, the assist gas has limited working pressure and flow ranges, and therefore cannot clear liquid off the work piece surface. Due to the configuration of the assist gas flow in relation to the liquid jet, which forms 90 degree angle with each other, high pressure can destroy the liquid-jet because of its large incident angle to the liquid-jet.

In some embodiments, the air jet can be configured to surround the liquid jet and run in a same direction, such as parallel or substantially parallel, with the liquid jet. In the following description, detailed description of parallel air jet is provided as examples of typical air jet directions. But the present invention is not so limited, and an air jet can run in a same direction as the liquid jet, e.g., parallel as well as making an angle between −90 and +90 degrees from the liquid jet direction, such as between −15 degrees (e.g., 15 degrees toward the liquid jet) to +45 degrees (e.g., 45 degrees away from the liquid jet), including −10, −5, 0, 5, 10, 15, 20, 25, and 25 degrees. The air jet can be produced separately from the liquid jet, e.g., the air jet can run parallel to and surrounding the liquid jet while being separated from each other by a solid separation in the coupling unit. Thus the air jet can be independently controlled without or with minimum effect on the liquid jet operation. The air jet and the liquid jet can leave the system, e.g., the coupling unit, at two separate openings, such as a middle opening for the liquid jet and a surrounding opening for the air jet. In some embodiments, an assist gas be included, for example, the liquid jet can be enveloped in the assist gas, and both the assist gas and the liquid jet can emerge from the system, e.g., the coupling unit, at a same opening.

In some embodiments, the air jet can allow the laser beam to directly process the material, without the potential interference from any liquid accumulated at the working area. The air jet can reduce the liquid at the surface of the work piece, such as keeping the surface dry to optimize the efficiency of the liquid jet guided laser beam. For example, by reducing the amount of liquid at the surface, back reflection in the direction of the processing head exit can be minimized or eliminated. Further, the liquid quality of the liquid jet at the contact point to the surface can be increased, e.g., not being affected by the liquid accumulated at the surface.

In some embodiments, the air jet can improve the operation of the liquid jet guided laser beam, for example, by removing liquid mist, or liquid drop accumulated from the liquid mist, from the liquid jet. For example, during the processing of the work piece, liquid mist can appear on the exit side of the coupling unit of the laser cutting head. The liquid mist can cumulate and fall down in the form of a liquid drop. Due to the surface tension of the liquid, such drops can be pulled toward, e.g., approaching, the actual liquid-jet. Upon release of such drop, the liquid-jet will be disrupted for a short period, which can be caused stop the laser processing of the work piece during such disruption of the liquid-jet. The exit side of the coupling unit can be mechanically formed to allow gravity to pull the liquid drops away from the liquid-jet, some liquid drops can still be pulled toward the liquid-jet, for example, due to the strong surface tension of some liquids.

In some embodiments, the air jet can improve liquid jet guided laser processing inside cavities of 3-dimensional work pieces. During the processing, such cavities can be quickly filled up with liquid, e.g., from the liquid jet. The actual liquid jet then needs to penetrate through a liquid film before reaching the surface of the work piece. Such liquid film can be a few millimeters up to multiple centimeters high. Such liquid film can destroy the liquid to ambient barrier that is required for adequate guiding of the light in the liquid-jet by internal reflection. The kinetic energy of the liquid-jet can not be sufficient to maintain such a liquid to ambient barrier. The air jet can be optimized to clear the liquid film in such cavities, at least in the working area of the liquid jet. The liquid jet can process the work piece at 3-dimensional configurations without being affected. The liquid-jet pressure and air jet pressure can be independently controlled for this purpose.

Figure 2A:
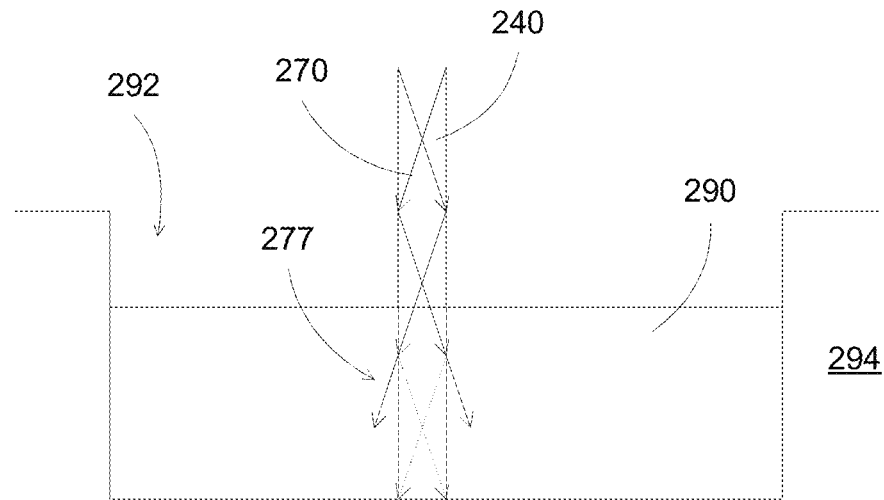
FIGS. 2A-2B illustrate effects of an air jet according to some embodiments.
Figure 2B:
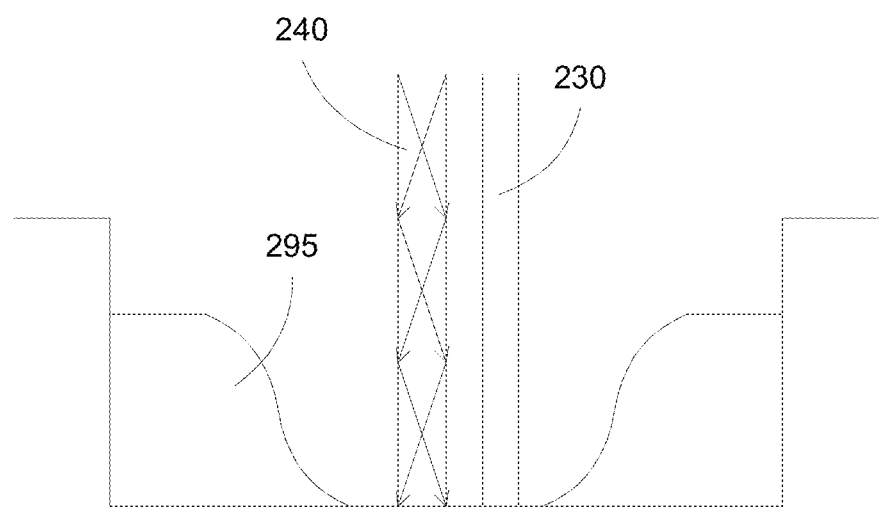

FIGS. 2A-2B illustrate effects of an air jet according to some embodiments. In FIG. 2A liquid 290 can be accumulated in a cavity 292 of a workpiece 294. Laser beam 270 can be internally reflected in a liquid jet 240. Due to the accumulated liquid 290, the laser beam can be diverged 277 to the accumulated liquid 290, due to the absence of an air-liquid interface that is necessary for the internal reflection guidance. The diverged laser beam can lower the amount of laser energy directed toward the workpiece surface for processing, such as cutting.

In FIG. 2B, an air jet 230 can be provided together with the liquid jet 240. The air jet can be formed by providing a flow of gas or gas/liquid mixture. The air jet can clear the accumulated liquid, e.g., pushing the liquid 295 away from the liquid jet to present a surface free of liquid under the liquid jet. The laser power can be internally reflected to the surface of the workpiece, with minimal or no laser power loss. The air jet can be independent of the liquid jet, having a high range of pressure or flow without affecting the operation of the liquid jet.

In some embodiments, the air jet can be configured to surround the liquid jet. The surrounded air jet can clear the working area of the liquid jet, e.g., removing liquid at the area that the laser beam, embedded in the liquid jet, need to contact the workpiece surface. The air jet can blow away liquid also at the deep cut, which can easily have liquid accumulated therein.

Figure 3A:
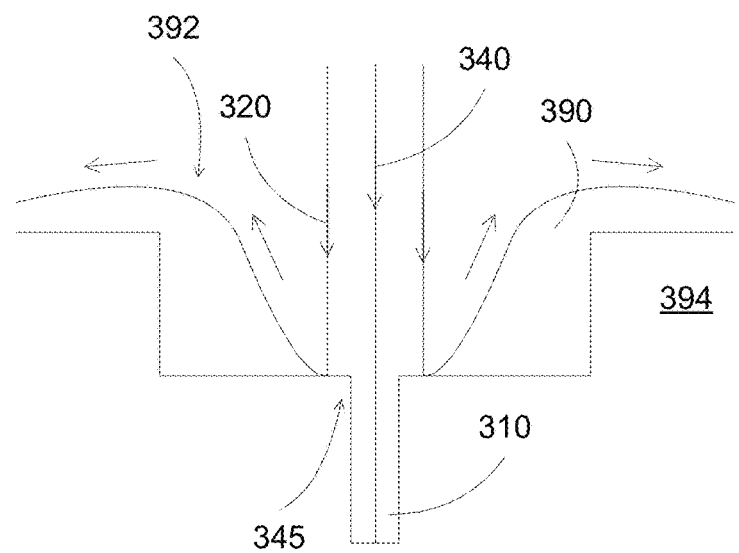
FIGS. 3A-3C illustrate effects of an air jet according to some embodiments.
Figure 3B:
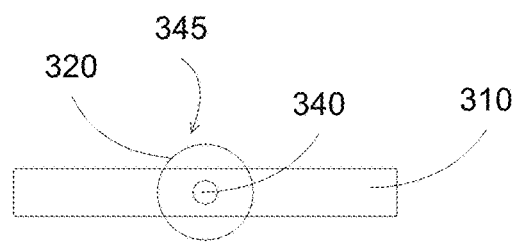
Figure 3C:
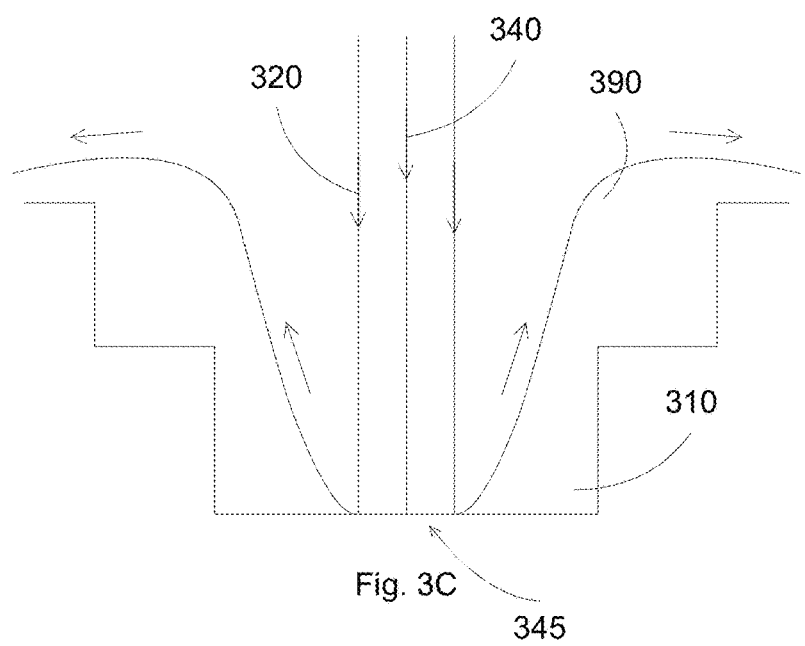

FIGS. 3A-3C illustrate effects of an air jet according to some embodiments. FIG. 3A shows a cross section view perpendicular to a cut 310 in a cavity 392 of a workpiece 394, showing a short side of the cut 310. FIG. 3B shows a corresponding top view of the cut 310. FIG. 3C shows a corresponding cross section view along the cut 310, showing a long side of the cut 310. A liquid jet 340 can reach the bottom side of the cavity 392, cutting through the material of the workpiece 394 to form the cut 310. An air jet 320, which surrounds the liquid jet 340, runs along the liquid jet 340 to push liquid 390 away from the working area 345 of the laser beam embedded in the liquid jet. The air jet can clear the liquid even in a portion of the cut 310, exposing the working area 345 so that the laser beam can contact the surface of the workpiece without being diverged from the liquid jet.

In some embodiments, the air jet can be used together with the assist gas. The assist gas can be configured to optimize a laminar length of the liquid jet, and the air jet can be configured to optimize a surface preparation of the work piece. For example, it would be difficult to use the assist gas to prevent a cavity from being flooded with liquid, because the optimal assist gas pressure is not sufficient to remove the liquid from the cavity. A modification of the assist gas, such as increasing the assist gas pressure beyond the optimum working range, would destroy or strongly reduce the liquid-jet laminar length.

In some embodiments, the present invention discloses systems and methods to keep the work piece surface free from liquid accumulation while performing liquid-jet guided laser based material processing, which then can allow the liquid-jet to reach the work piece surface directly. A air jet can be provided, which can strike the work piece surface in a vicinity of the liquid jet with controllable pressure and flow to reduce or clear any liquid accumulated on the surface. The air jet can be configured to reduce or eliminate any liquid-jet interruptions or splashes caused by liquid mist drops that are pulled to the liquid-jet by surface tension. For example, by running the air jet in the same direction such as parallel and surrounding the liquid jet, the liquid mist drops can be attracted toward the air jet. Further, the surrounded parallel air jet can also assist in improving the laminar flow length of the liquid jet, for example, to provide an independent control of assist gas pressure in relation to its effect on the laminar length of the liquid-jet.

FIGS. 4A-4C illustrate a schematic operation of a liquid jet guided laser beam having an air jet according to some embodiments. In FIG. 4A, a liquid source 400, such as a water flow source, is configured to generate a liquid jet 440. A laser beam can be embedded in the liquid jet 440, which can strike an object surface 490 for processing the object, such as cutting the object. A gas source 410, such as a compressed air, gas or fluid source, is configured to generate an air jet 420. As discussed above, an air jet can also be called a gas jet or a fluid jet, including a flow of a gas or a gas/fluid mixture. A separator 460 can be included to separate the liquid jet 440 and the air jet 420, at least at a beginning portion of the liquid jet and air jet. The separator can provide independent controls of the liquid jet and air jet, e.g., high pressure and high flow of the air jet can have no or minimum effect of the operation of the liquid jet.

In FIG. 4B, a liquid source 402 and a gas source 412 can be two independent and separate units. For example, the liquid source 402 can provide a liquid flow through a coupling unit to generate a liquid jet 442. A laser source can be included for focusing a laser beam to the liquid jet and guided by the liquid jet toward the object surface 492. An assist gas source can be optionally included, enveloping and exiting at a same opening as the liquid jet. The assist gas conditions can be selected to optimize the laminar flow length of the liquid jet. The gas source can provide an air jet 422, which can strike the object surface at a vicinity of the liquid jet.

In FIG. 4C, a gas source 414 can be embedded, but independent, from a liquid source 404. An air jet 424 can run in the same direction such as to the liquid jet 444, and thus can strike the object surface at an area close to the area struck by the liquid jet.

In some embodiments, the characteristics of the air jet 424 can be chosen to clear the object surface from accumulated liquid. For example, the object can have a 3 dimensional feature 494 that can form a cavity to contain liquid. Thus liquid from the liquid jet can accumulate in the cavity, forming a liquid film that can hinder or interfere with the operation of the liquid jet, for example, by destroying the liquid column that confines the laser beam. The air jet 424 can clear the liquid film, pushing the liquid 450 away from the working area 455. The air jet 424 thus can prepare the surface of the object, removing any accumulated liquid to provide a suitable surface for the liquid jet guided laser beam 414.

Figure 5A:
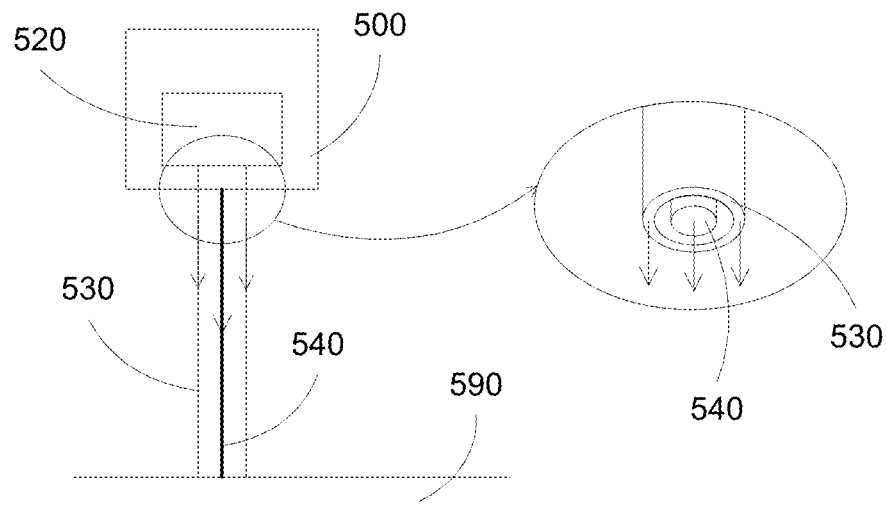
FIGS. 5A-5C illustrate different configurations of the air jet according to some embodiments.
Figure 5B:
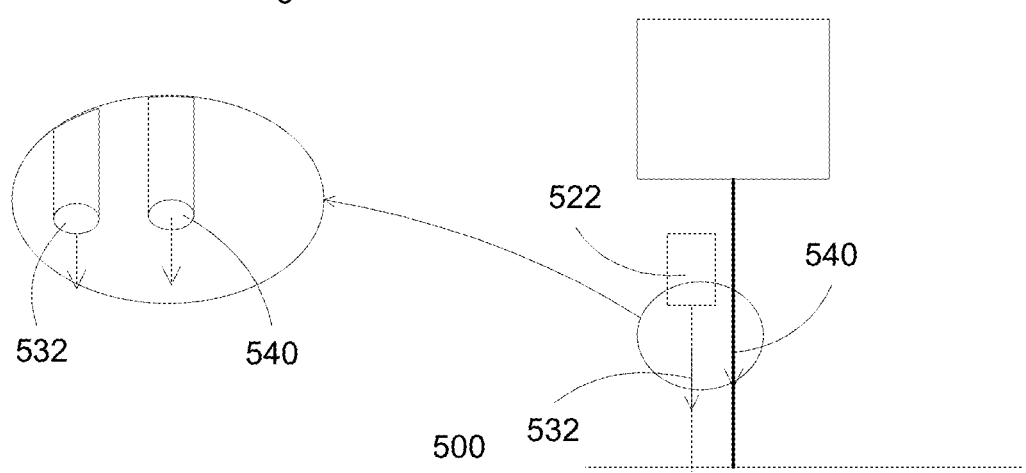
Figure 5C:
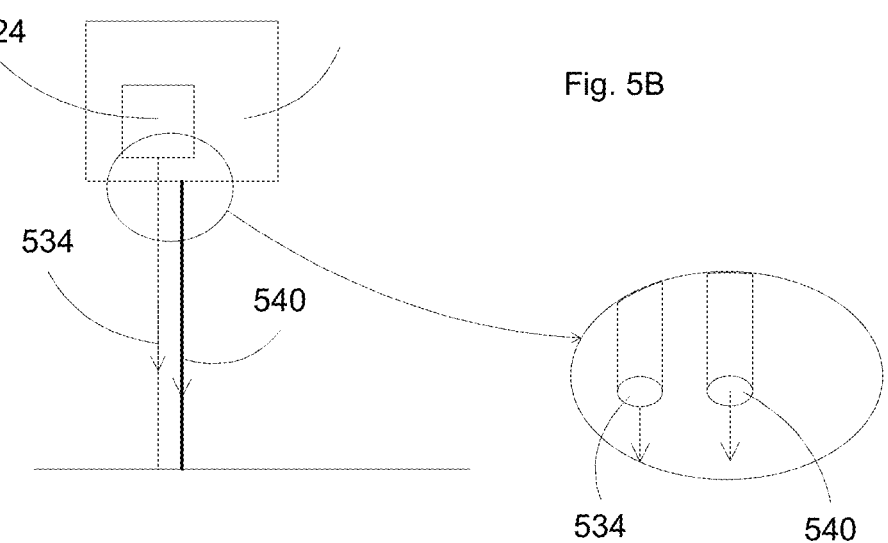

FIGS. 5A-5C illustrate different configurations of the air jet according to some embodiments. A system 500 can generate a liquid jet guided laser beam 540 toward an object surface 590. The system 500 can optionally generate an assist gas flow enveloping the liquid jet guided laser beam 540. The assist gas configuration can be optimized for improve the laminar flow of the liquid jet, and can exit the system 500 at a same opening as the liquid jet.

In FIG. 5A, a gas source 520 can be integrated to system 500 to generate a air jet 530. The air jet 530 can run in the same direction such as parallel with the liquid jet 540, and can surround the liquid jet 540, such as forming a concentric flow surrounding the liquid jet 540. The air jet 530 and the liquid jet 540 can exit the system 500 at separate openings, e.g., there are two separate nozzles for the liquid jet and the air jet, with the nozzle for the air jet forming an envelope around the nozzle for the liquid jet. The concentric feature of the liquid jet and the air jet can provide a radial symmetric configuration, which can be effective in improving the operation of the liquid jet guided laser beam. Concentric walls can be used to separate the air jet 530 from the liquid jet 540, at least in the system 500 before the air jet and the liquid jet leaving the system 500.

FIGS. 5B and 5C show alternative configurations for the air jet. The air jet can be configured to run in the same direction such as parallel to the liquid jet. In FIG. 5B, a separate air jet source 522 can be used, which can generate a air jet 532 for the liquid jet 540. In FIG. 5C, an air jet source 524 can be integrated to the system 500, which can generate a parallel air jet 534. Different conduits can be used to separate the air jet 532/434 from the liquid jet 540, at least in the system 500 before the air jet and the liquid jet leaving the system 500.

In some embodiments, the air jet can form an angle with the liquid jet, for example, to optimize the operation of the liquid jet guided laser operation. In general, an air jet can be provided so that the air jet impacts the surface of the workpiece at a location at or near the location that the liquid jet impacts the surface. Due to the potential interference between the air jet and the liquid jet outside of the liquid and gas sources, the air jet can be diverged from the liquid jet.

FIGS. 6A-6C illustrate different flow directions of the air jet according to some embodiments. In FIG. 6A, for a workpiece 691 that can be placed near, e.g., a small distance 651 (about less than 2 cm, less than 1 cm, or less than 0.5 cm) to the liquid jet guided laser system 601, the air jet 631 can be directed toward the liquid jet 641, such as between 0 and −20 degrees, or between 0 and −10 degrees. The angle between the air jet and the liquid jet can be defined as a negative angle if the air jet is directed toward the liquid jet from the direction from the laser system to the workpiece, as shown in FIG. 6A. The small distance 651 can be used if the workpiece is concave down or flat, allowing the laser system to travel across the workpiece without interference. In addition, the air jet can have low pressure and low flow due to the small distance. For example, operating conditions (such as pressure and flow) of a gas source can be regulated to generate an air jet having low pressure and low flow.

In FIG. 6B, for a workpiece 692 that can be placed a little farther, e.g., a medium distance 652 (about less than 6 cm, less than 2 cm, or less than 1 cm) to the liquid jet guided laser system 602, the air jet 632 can be directed substantially parallel to the liquid jet 642, such as deviating less than 1 or 2 degrees from the parallel direction. The medium distance 652 can be used if the workpiece is flat, allowing the laser system to travel across the workpiece without interference. In addition, the air jet can have medium pressure and medium flow due to the medium distance. For example, operating conditions (such as pressure and flow) of a gas source can be regulated to generate an air jet having medium pressure (such as less than 6 bar or less than 2 bar pressure) and medium flow (such as less than 6 or less than 2 standard liters per minute).

In FIG. 6C, for a workpiece 693 that can be placed far, e.g., a large distance 653 (about greater than 1 cm, greater than 6 cm, or greater than 10 cm) to the liquid jet guided laser system 603, the air jet 633 can be directed away from the liquid jet 643, such as between 0 and 45 degrees, or between 0 and 30 degrees. The angle between the air jet and the liquid jet can be defined as a positive angle if the air jet is directed away from the liquid jet from the direction from the laser system to the workpiece, as shown in FIG. 6C. The large distance 653 can be used if the workpiece has irregular surface topology, such as a cavity that recesses under a top surface of the workpiece. For large distances 653, the air jet pressure of flow might need to be increased, for example, to travel the large distances 653 and to clear liquid from a cavity. For example, operating conditions (such as pressure and flow) of a gas source can be regulated to generate an air jet having high pressure (such as less than 10 bar or less than 6 bar pressure) and high flow (such as less than 10 or less than 6 standard liters per minute). The high pressure and flow can potential interfere with the liquid jet, for example, by shortening the laminar length of the liquid jet, if running parallel or toward the liquid jet.

In some embodiments, the present invention discloses methods and systems for operating a liquid jet guided laser systems, including generating an independent gas flow surrounding a liquid jet. The independent gas flow can be a gaseous flow or a flow containing a mixture of a gas and a liquid, such as an aerosol flow. The independent gas flow can be configured to be independent with the liquid jet, e.g., having a wide range of operating conditions that do not significantly affect the operation of the liquid jet. For example, the independent can have a high pressure, such as capable of running at 10 bar pressure or higher without significantly shorten the laminar length of the liquid jet. The independent flow configurations can be achieved by having a wall or a partition between the gas flow and the liquid jet, for example, inside a coupling unit, so that the gas flow and liquid jet can run with apart from each other, such as running substantially parallel or running away from each other at a small angle (e.g., less than 30 degrees).

FIGS. 7A-7B illustrate flow charts for running a liquid jet guided laser beam according to some embodiments. In FIG. 7A, operation 700 provides a laser beam embedded in a liquid jet, for example, generated from a system having a laser beam focused on a liquid jet. The system can optionally include an assist gas for optimizing the liquid jet laminar flow. The liquid jet can be directed toward an object, and can make contact to the object surface. Operation 710 flows a gas flow, e.g., an air jet, to the object surface. The gas flow is configured to blow liquid away from the object surface. For example, the gas flow pressure and flow rate can be so that any liquid accumulated on the object surface is pushed away from the area that the liquid jet contacts the object. The gas flow can be configured to not affect the liquid jet, such as not intersecting the liquid jet. The gas flow can be configured to be independent of the liquid jet, e.g., having operating conditions that can be adjusted without having significant effect on the liquid jet.

In FIG. 7B, operation 730 emits a laser beam toward an object surface. The laser beam is guided by a liquid jet. Operation 740 flows a gas flow toward the object surface. The gas flow is configured to run in the same direction, such as substantially parallel to the liquid jet and not intersecting the liquid jet, and to surround the liquid jet. The gas flow is also configured so that a portion of the parallel run of the gas and liquid jet is separated by a separation, e.g., the gas flow and the liquid jet leave the system in two separate nozzles. The gas flow conditions are selected to blow liquid away from the object surface.

In some embodiments, the present invention discloses systems and methods for processing materials using a liquid jet guided laser. The methods can include generating a air jet column that is guided concentrically, yet in-direct around the liquid jet. The system can include a mechanical separation inside the coupling unit for the air jet and the liquid jet. The air jet can be actively guided in the same direction as the liquid jet. The air jet can also allow the liquid-jet to interrupt the vacuum that builds on the exit side of the nozzle by means of pulling a small amount of air jet.

In some embodiments, the present invention discloses methods and systems for operating a liquid jet guided laser systems, including changing operating conditions, such as direction, pressure and flow volume, of the air jet. For example, for flat or concave down workpiece, the laser system can run close to the workpiece surface, for example, to improve the power transfer from the laser to the workpiece surface. The air jet direction can be parallel with the liquid jet, or can be directed toward the liquid jet. The gas pressure can be low, such as less than 5 bar, less than 2 bar, or less than 1 bar pressure. The gas flow can also be low, such as less than 5 slm (standard liters per minute), less than 2 slm, or less than 1 slm flow.

In some embodiments, different air jet nozzles can be used to provide different flow directions. For example, an air jet nozzle having parallel walls, e.g., walls that are parallel to the liquid jet flow direction, can be used to generate an air jet with parallel flow. An air jet nozzle having diverged walls, e.g., walls that spread out toward the exit port, can be used to generate an air jet with diverged flow, e.g., flowing away from the liquid jet.

Figure 8:
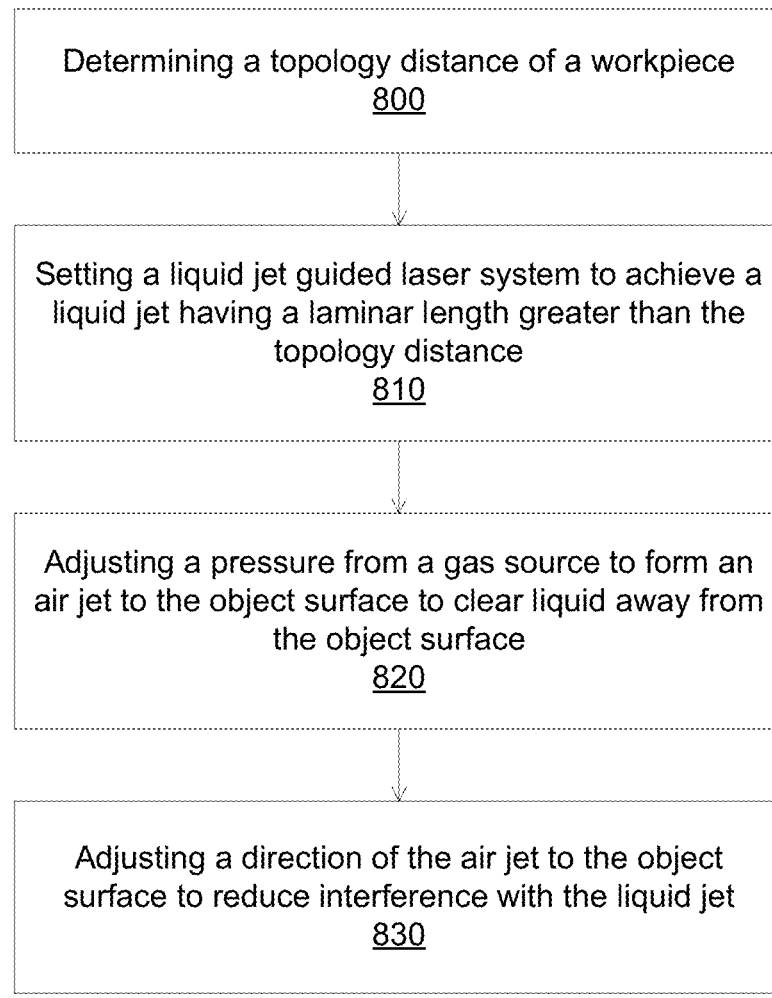
FIG. 8 illustrates a flow chart for operating a liquid jet guided laser system according to some embodiments.

FIG. 8 illustrates a flow chart for operating a liquid jet guided laser system according to some embodiments. In operation 800, a topology distance of a workpiece is determined. The topology can be determined as a maximum distance from a bottom surface of a cavity to a top surface of the workpiece. The top surface can be the highest surface of the workpiece. The bottom surface can be the bottom surface of a cavity that can be processed by the laser system. In some embodiments, the depth of the desired cut can be taken into account, e.g., adding to the length of the topology distance. Thus the bottom surface that is to be processed by the laser system, of a deepest cavity can be selected to calculate the maximum distance from the highest surface of the workpiece. Operation 810 sets a liquid jet guided laser system to achieve a liquid jet having a laminar length greater than the topology distance. For example, a laser system having a liquid jet with a laminar length greater than the topology distance can be used to process the workpiece. In general, the laser system can be set above the highest surface of the workpiece, and the liquid jet can travel from the laser system, e.g., from the liquid nozzle in the coupling unit, toward and reaching the bottom surface of the cavities in the workpiece.

Operation 820 adjusts a pressure from a gas source to form an air jet to the object surface to clear liquid away from the object surface. In some embodiments, the maximum pressure can be 10 bar or higher. The pressure of the gas source can be adjusted based on the topology distance of the workpiece, and/or based on the liquid retaining capability of the workpiece. For example, if the topology distance is small, e.g., less than 1 cm, and the workpiece does not accumulate much liquid, e.g., a tilted flat workpiece so that the liquid drains away from the surface, a low pressure, e.g., less than 1 bar, such as between 0.05 bar to 1 bar, or between 0.5 bar to 1 bar, can be used. If the topology distance is large, e.g., greater than 0.5 cm or 1 cm, for example, due to the presence of deep cavities, the workpiece can accumulate liquid, for example, in the cavities. A high pressure can be used to clear a portion of the surface from the accumulated liquid, for example, driving the liquid away from the area surrounding the liquid jet. The pressure can be less than 10 bar, such as between 0.5 bar to 0 bar, or between 1 bar to 10 bar.

Operation 830 adjusts a direction of the air jet to the object surface to reduce interference with the liquid jet. The angle of the air jet can be adjusted based on the topology distance of the workpiece, and/or based on the liquid retaining capability of the workpiece. The angle of the air jet can be adjusted by manually replacing an air jet nozzle, e.g., selecting an appropriate air jet nozzle based on air jet nozzles having different gas direction, such as parallel gas direction, diverged gas direction away from the liquid jet, or converged gas direction toward the liquid jet.

For example, if the topology distance is small, e.g., less than 1 cm, and the workpiece does not accumulate much liquid, e.g., a tilted flat workpiece so that the liquid drains away from the surface, a low pressure, e.g., less than 1 bar, such as between 0.05 bar to 1 bar, or between 0.5 bar to 1 bar, can be used. If the topology distance is large, e.g., greater than 0.5 cm or 1 cm, for example, due to the presence of deep cavities, the workpiece can accumulate liquid, for example, in the cavities. A high pressure can be used to clear a portion of the surface from the accumulated liquid, for example, driving the liquid away from the area surrounding the liquid jet. The pressure can be less than 10 bar, such as between 0.5 bar to 0 bar, or between 1 bar to 10 bar.

FIGS. 9A-9C illustrates a schematic of different air jets according to some embodiments. A coupling unit can be configured to allow a liquid jet and an air jet to pass through in different conduits. For example, there can be a physical separation between the conduit that carries the liquid jet and the conduit that carries the air jet. Thus the air jet and the liquid jet can emerge from the coupling unit without any interference. For example, the air jet and the liquid jet can run parallel, or can form and angle so that the air jet and the liquid jet do not intersect in the distance between the coupling unit and the surface of the workpiece.

In some embodiments, the present invention discloses a liquid jet guided laser system for processing a workpiece. The liquid jet guided laser system can include a laser for emitting a laser beam, together with an optical element, such as a mirror and/or a lens, for coupling the laser beam with a liquid environment. The liquid environment can include an assembly to generate a liquid jet. The laser beam can be coupled to the liquid jet to form internal reflection in the liquid jet. The liquid jet can be formed by a nozzle module, which can be configured to be connected to a liquid supply line for forming a liquid jet. The liquid supply line can include a liquid source, such as a water source or an alcohol source, which is under a liquid pressure to generate a liquid flow to the nozzle module, for example, through a liquid inlet.

The liquid jet guided laser system can include an air jet module to generate a gas flow (which can be a gas flow or a flow of a gas/liquid mixture). The gas flow can be configured to remove liquid at the working surface area of the liquid jet guided laser system, such as the surface area surrounding the liquid jet. Since the liquid jet carries a liquid, when the liquid jet contacts the workpiece surface, some liquid can be accumulated at the workpiece surface. The accumulated liquid can interfere with the operation of the liquid jet guided laser system, such as eliminating or changing the location of the boundary condition of an air-liquid interface, which can result in a re-direction of the laser beam.

In FIG. 9A, a coupling unit 900 can include a window (not shown), a nozzle module 910 and an air jet module 950. The nozzle module can include a nozzle having an opening to form a liquid jet 940. The window can be configured to isolate the liquid environment generated by the liquid jet 940 from a dry environment of a laser beam.

The air jet module is coupled to the nozzle module, for example, to accept the liquid jet 940 generated from the nozzle module, together with forming a gas flow 930 surrounding and separated from the liquid jet. For example, the air jet module 950 can include a double wall configuration, such as an inner wall 952 and an outer wall 954. The inner wall can form a first conduit 922 for accepting the liquid jet to pass through. For example, the inner wall can have a hollow cylinder shape, with the hollow portion larger than a diameter of the liquid jet for passing the liquid jet. The hollow cylinder can have a top larger opening for coupling with a cavity 952 in the nozzle module. The hollow cylinder can have a straight conduit portion to guide the liquid jet for forming a laminar flow.

The inner wall and the outer wall can form a second conduit 926 surrounding the first conduit. The second conduit can be configured to accept a gas flow, for example, the outer wall can include a gas inlet for connecting to a gas supply line. The gas flow from the supply line can generate a gas flow through the second conduit. The gas flow can surround the liquid jet. The gas flow 930, e.g., the air jet, can flow in a same direction as the liquid jet 940, for example, parallel to the liquid jet flow 940. For example, the inner wall can be configured so that the gas flow is substantially parallel with the liquid jet. For example, the outer surface of the inner wall can be substantially parallel to the liquid jet, thus the gas flow can exit the air jet nozzle with a direction substantially parallel to the liquid jet. The air jet 930 can push the liquid 995 on an object surface 990 so that the liquid jet 940 can interact directly with the object surface without encountering any liquid film. The air jet can be generated from a gas supply line, which can include a compressed gas with a pressure less than 10 bar, or a compressed gas with a maximum pressure of 10 bar. The pressure of the gas supply line can be configured to be independently adjustable with respect to the liquid jet.

In some embodiments, the inner wall can include at least a hole 923 to provide fluid communication between the first conduit and the second conduit. For example, a small amount of gas can enter the cavity 952 of the nozzle module to compensate for a vacuum formation due to the formation of the liquid jet. Alternatively, a separate gas flow can be introduced to the cavity 952 for vacuum compensation.

In some embodiments, one end, e.g., the extreme end that is exposed to the outside ambient, of the inner wall 952 and/or the outer wall 954 can be tapered outward. For example, the inner wall 952 can have one end 965 forming a tilted surface or a tapered outward surface, which can drain any liquid drop away from the liquid jet 940. The outer wall 954 can also have one end 960 forming a tilted surface or a tapered outward surface. Further, the air jet 930 can attract liquid mist around the liquid jet, thus helping to prevent liquid drops from being pulled to the liquid jet.

In some embodiments, the inner wall can be longer than the outer wall. For example, the tapered surface 965 can protrude farther than the tapered surface 960. Alternatively, the outer wall can be longer than the inner wall. For example, the tapered surface 960 can protrude farther than the tapered surface 965.

In some embodiments, the inner wall can be configured so that the gas flow is diverged from or converged to the liquid jet. For example, the outer surface of the inner wall can be tapered outward away from the liquid jet, thus the gas flow can exit the air jet nozzle with a direction forming a diverged angle with the liquid jet. The diverged angle can be less than 45, less than 30 degrees, less than 25 degrees, less than 20 degrees, less than 15 degrees, less than 10 degrees, or less than 5 degrees. In some embodiments, multiple air jet nozzles with different diverged angles can be provided, and an air jet nozzle with an appropriate diverged angle can be selected.

In FIG. 9B, an inner wall 952A of the air jet nozzle can have an outward conical shape, e.g., the outer surface of the conical inner wall 952A can be configured so that the outer air jet 930A diverges from the inner liquid jet flow 940. The inner wall 952A can have a middle opening for a liquid jet 940 and a surrounded opening for a air jet 930A. The air jet 930A can flow in a same direction as the liquid jet 940, for example, diverging from the liquid jet flow 940. The diverged angle, e.g., the angle of the conical surface with the liquid jet flow direction can be less than 45 degrees, such as less than 10, 20, 30 or 40 degrees.

In FIG. 9C, an inner wall 952B can have an inward conical shape, e.g., the outer surface of the conical inner wall 952B can be configured so that the outer air jet 930B converges to the inner liquid jet flow 940. The inner wall 952B can have a middle opening for a liquid jet 940 and a surrounded opening for a air jet 930B. The air jet 930B can flow in a same direction as the liquid jet 940, for example, converging to the liquid jet flow 940. The convergence angle, e.g., the angle of the conical surface with the liquid jet flow direction can be less than 45 degrees, such as less than 10, 20, 30 or 40 degrees.

Different configurations can be used for the coupling unit for guiding the air jet. The end surfaces of the coupling unit and the air jet nozzle can be flat or tapered for draining liquid droplets outward (e.g., away from the liquid jet). Different conduit shapes for the air jet can be used, such as concentric conduit for parallel air jet, or outward curving conduit for outward air jet.

In some embodiments, the present invention discloses a liquid jet guided laser system having an air jet nozzle insert for processing a workpiece. The air jet nozzle insert can be provided to a coupling unit to separate the liquid jet and the air jet. The insert can be exchangeable, allowing different flow configurations for the air jet.

Figure 10:
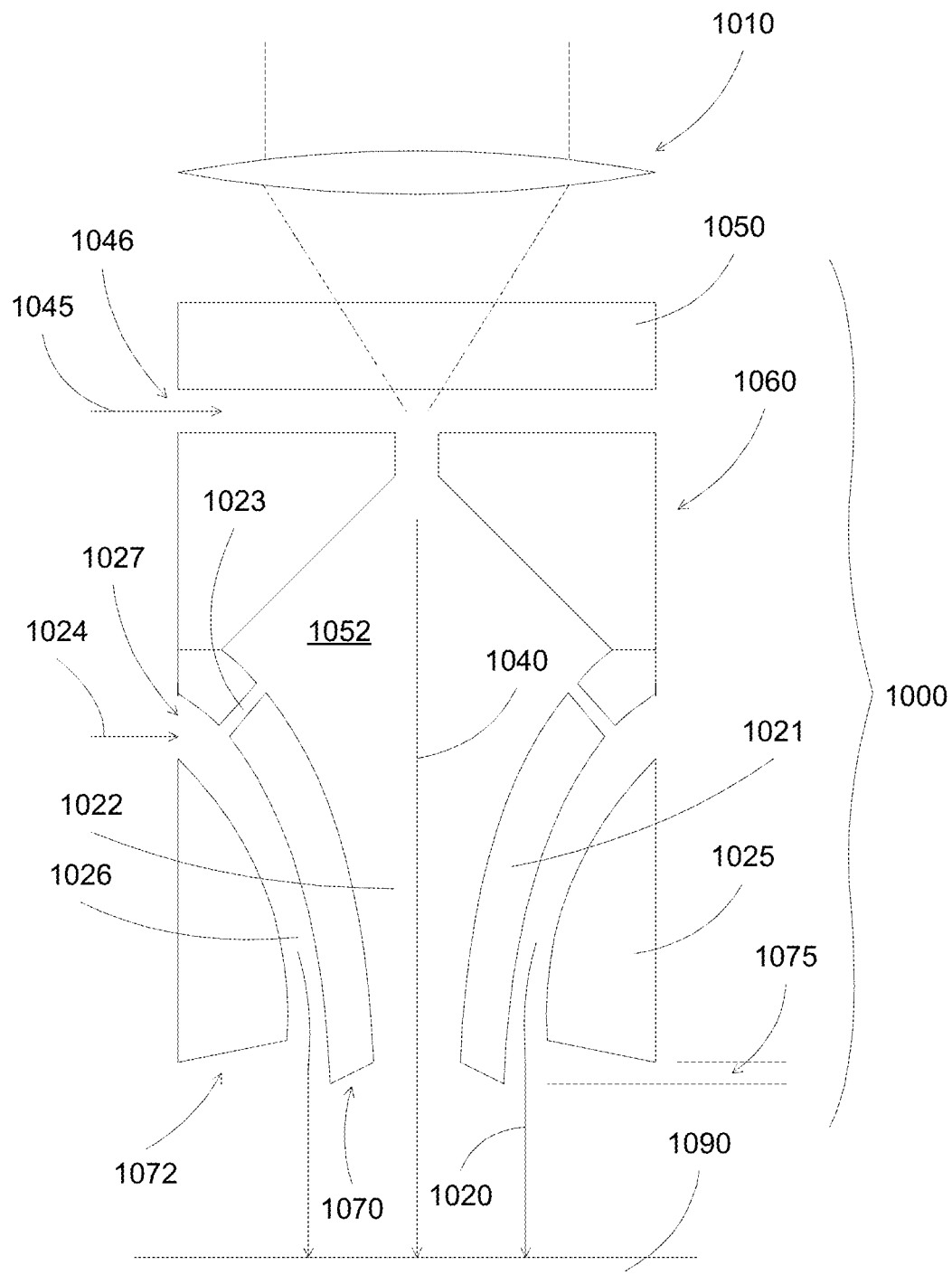
FIG. 10 illustrates a liquid jet guided laser system including a coupling unit having an air jet nozzle according to some embodiments.

FIG. 10 illustrates a liquid jet guided laser system including a coupling unit having an air jet nozzle according to some embodiments. The liquid jet guided laser system can include a laser system 1010, and a coupling unit 1000 for coupling the laser beam in the laser system with the liquid jet. The coupling unit 1000 can include an optical element, such as a window 1050, to isolate the liquid 1045 from the laser system 1010. The laser system 1010 can include a laser beam, which can be focused to the liquid, such as to the liquid portion or the liquid jet portion, to form internal reflection in the liquid jet.

The coupling unit 1000 can include a nozzle 1060, which can be configured to generate a liquid jet toward a surface of a workpiece 1090, together with coupling the laser system to the liquid jet. For example, a liquid source can provide a liquid 1045 to a liquid inlet 1046. The liquid can form a liquid jet 1040, for example, through a nozzle or a nozzle assembly 1060. The nozzle assembly 1060 can include a chamber or a cavity 1052 for stabilizing the liquid jet.

The coupling unit can include an air jet nozzle 1021, which can include an inner conduit 1022 for the liquid jet to pass through. The air jet nozzle 1021 can be configured to physically separate the liquid jet from an air jet 1020, such as shielding the liquid jet 1040 from external influence, such as shielding the liquid jet 1040 from the air jet 1020. The air jet nozzle can have a hollow cylinder shape, with the hollow portion larger than a diameter of the liquid jet for passing the liquid jet. The hollow cylinder can have a top larger opening for coupling with a cavity 1052 in the nozzle module. The hollow cylinder can have a straight conduit portion to guide the liquid jet for forming a laminar flow.

The coupling unit can include an air jet nozzle holder 1025, which can also function as a body or support for the coupling unit. The air jet nozzle 1021 and the air jet nozzle holder 1025 can form an outer conduit 1026, which can surround the inner conduit 1022. Gas or gas/liquid mixture 1024 can be provided to the outer conduit 1026, for example, through a gas inlet 1027, to form the air jet 1020. Since the air jet and the liquid jet are physically separated by a partition, e.g., a wall such as the air jet nozzle 1021, the air jet and the liquid jet can be independently from each other, meaning there can be a wide range of operating conditions, including pressure and flow, of the air jet that do not or minimally affect the operation of the liquid jet. In addition, the direction of the air jet can be adjusted, such as tilted outward so that the air jet diverges from the liquid jet, higher pressure and flow for the air jet can be used without affecting the liquid jet.

In some embodiments, the nozzle 1060 can have a cavity 1052 at the outlet of the nozzle, to optimize the liquid jet, such as to stabilize the liquid jet. The cavity 1052 can have a low pressure, e.g., lower than an outside ambient pressure. The low pressure, e.g., vacuum condition, can generate some turbulence in the liquid jet formation.

In some embodiments, the present invention discloses providing a gas to the cavity of the nozzle to compensate for the vacuum pressure. The gas can be provided from a gas source, or from the air jet. For example, a hole 1023 in the air jet nozzle can reduce the vacuum level, e.g., increasing the pressure, in the cavity 1052 of the nozzle area. The air jet can be generated from a gas supply line, which can include a compressed gas with a pressure less than 10 bar, or a compressed gas with a maximum pressure of 10 bar. The pressure of the gas supply line can be configured to be independently adjustable with respect to the liquid jet.

The air jet can be generated from a gas supply line, which can include a compressed gas with a pressure less than 10 bar, or a compressed gas with a maximum pressure of 10 bar. The pressure of the gas supply line can be configured to be independently adjustable with respect to the liquid jet.

In some embodiments, one end 1070 of the air jet nozzle can be tapered outward, forming an outward tilted surface or a tapered outward surface, which can drain any liquid drop away from the liquid jet 1040. One end 1072 of the air jet nozzle holder can also be tapered outward, forming an outward tilted surface or a tapered outward surface, which can drain any liquid drop away from the liquid jet 1040. The air jet nozzle can be longer than the air jet nozzle holder, e.g., there is a distance 1075 between an end of the air jet nozzle and an end of the air jet nozzle holder.

FIGS. 11A-11D illustrate a schematic of a coupling unit for liquid jet guided laser processing according to some embodiments. FIG. 11A shows a cross section of the coupling unit, and FIGS. 11B-11D show perspective views of different air jet nozzle 1170, 1172, and 1174 in the coupling unit. A transparent window 1120 can be used to separate the dry portion of a laser beam 1110 and the liquid portion of a liquid jet 1140. A lens (not shown) can be used to focus the laser beam 1110 onto the liquid jet. A nozzle 1150 can be coupled to the window 1120, leaving a small gap for accepting a liquid, such as water, from a liquid source 1145. The coupling unit has an opening in the middle for the liquid to exit as a liquid jet 1140. The nozzle is open at an opposite end to form a cavity 1152, which can improve the laminar flow of the liquid jet 1140.

An air jet nozzle 1170 can be coupled to the nozzle 1150, for example, closing the cavity 1155 and guiding the liquid jet 1140 to the exit. The air jet nozzle 1170 can be shaped at the outside to generate a gas flow 1130 from a gas source 1135. The air jet nozzle can surround the liquid jet, and form the air jet 1130 in a parallel direction. Thus the air jet nozzle 1170 can be configured to provide a parallel and surrounding air jet 1130 with respect to the liquid jet 1140. The air jet nozzle can form a partition between the air jet 1130 and the liquid jet 1140, e.g., the liquid jet and the air jet exit the coupling unit at two separate nozzle openings. The air jet nozzle can provide a separation, which can allow for the independent control of the air jet, e.g., controlling the pressure and flow rate to achieve an optimum surface clearing process while not interfering with the liquid jet operation.

Different air jet nozzles are shown in FIGS. 11B-11D. In FIG. 11B, an air jet nozzle 1170 can have a vertical outer surface, e.g., a surface parallel with the vertical flow of the liquid jet, such that the angle 1190 of the outer surface and the liquid jet flow direction is about zero. In FIG. 11C, an air jet nozzle 1172 can have an outward vertical outer surface, e.g., a surface making a diverged angle with the vertical flow of the liquid jet, such that the angle 1192 of the outer surface and the liquid jet flow direction is greater than zero. The direction of the angle is such that the air jet is diverged from the liquid jet when hitting the object surface. In FIG. 11D, an air jet nozzle 1174 can have an inward vertical outer surface, e.g., a surface making a converged angle with the vertical flow of the liquid jet, such that the angle 1194 of the outer surface and the liquid jet flow direction is greater than zero. The direction of the angle is such that the air jet is converged with the liquid jet in the direction of the object surface. The convergent air jet can be close to, but not interfere with, the liquid jet when hitting the object surface.

The bottom 1157 of the air jet nozzle can be tapered outward, for example, to guide any liquid droplets away from the liquid jet for minimal interference with the liquid jet. Similarly, the bottom 1159 of the coupling unit bottom portion 1155 can also be tapered outward, e.g., away from the central portion that houses the liquid jet.

In some embodiments, the air jet 1130 can be configured to attract or lead liquid mist away from the liquid jet 1140. For example, the tapered surfaces 1157 and 1159 can be effective for large liquid droplets, but can be less effective for smaller droplets, such as liquid mist, which might occur far from the tapered surfaces. The air jet can thus guide the liquid mist away from the liquid jet, for example, preventing the liquid mist from cumulating and potentially disrupting the liquid jet operation.

FIG. 12 illustrates a flow chart for operating a liquid jet guided laser system according to some embodiments. Operation 1200 supplies a liquid to a nozzle module to form a liquid jet, wherein the liquid jet is configured to pass through a first conduit formed by an inner wall of an air jet module. Operation 1210 focuses a laser beam to form internal reflection in at least a portion of the liquid jet. Operation 1220 supplies a gas flow to form an air jet in a second conduit, wherein the second conduit is formed between the inner wall and an outer wall of the air jet module, wherein the air jet is configured to surround the liquid jet, wherein the air jet and the liquid jet are guided toward a workpiece.

FIG. 13 illustrates a flow chart for operating a liquid jet guided laser system according to some embodiments. Operation 1300 supplies a liquid to a nozzle to form a liquid jet, wherein the liquid jet is configured to pass through a first conduit inside an air jet nozzle. Operation 1310 focuses a laser beam to form internal reflection in at least a portion of the liquid jet. Operation 1320 supplies a gas flow to a second conduit between an outside of the air jet nozzle and an inside of an air jet nozzle holder to form an air jet, wherein the air jet is configured to surround the liquid jet, wherein the air jet nozzle is configured to shield the liquid jet from the air jet, wherein the air jet and the liquid jet are guided toward a workpiece.

Figure 14A:
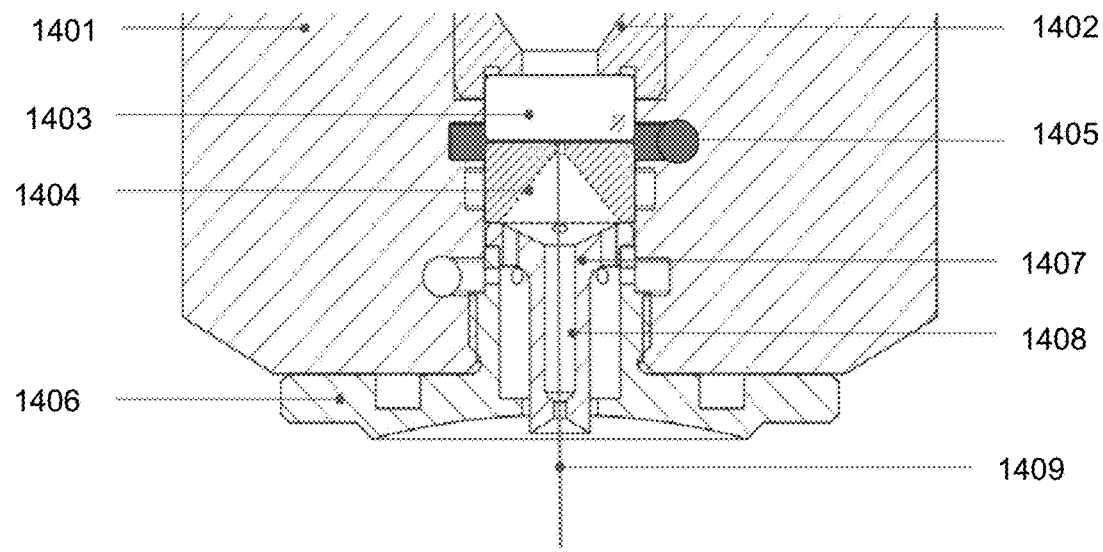
FIGS. 14A-14B illustrate a coupling unit for a liquid jet guided laser system according to some embodiments.
Figure 14B:
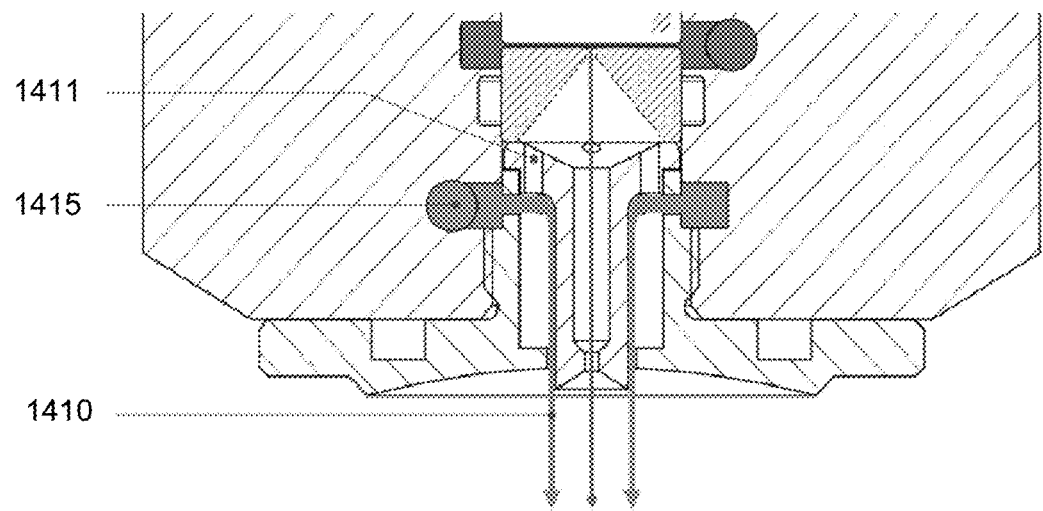

FIGS. 14A-14B illustrate a coupling unit for a liquid jet guided laser system according to some embodiments. A coupling unit 1401 can be manufactured as CNC-milled metal part. On the top side there is a cone shaped entrance 1402 for the laser beam. Below the cone shaped entrance 1402 is the laser window 1403. The gap between laser the window 1403 and nozzle 1404 is filled with liquid by a drilled hole 1405. The nozzle 1404 is held in place by a counter screw 1406 that is mounted from the bottom side of the coupling unit 1401. Between the counter screw 1406 and the nozzle 1404, a flow-insert 1407, e.g., an air jet nozzle, is mounted. The flow-insert 1407 has a concentrically drilled center hole 1408 through which the liquid-jet 1409 passes and that mechanically separates the liquid-jet 1409 from the air jet 1410, which is provided by a separate drilled hole 1415 inside the coupling unit 1401. This mechanical separation inside the coupling unit 1401 generates a concentric and in-direct air jet 1410 flow column around the liquid-jet 1409 that exists both inside and outside/below of the coupling unit 1401. Furthermore, the flow-insert 1407 inlet connection to the drilled hole 1415 for air jet inside the coupling unit is shaped in such way that the air jet 1410 flow direction is downwards in the same direction as the liquid-jet 1409.

Both the counter screw 1406 and the flow-insert 1407 have a convex or conical shape on the exit side. The convex or conical shape is used to guide cumulated liquid mist drops away from the liquid-jet 1409. The downward air jet 1410 flow works as a barrier column around the liquid-jet 1409 and actively blows away liquid mist drops, which are near the center of the counter screw 1406. Holes 1411 can be provided in the flow-insert 1407 for equilibrating the pressure in the cavity at the nozzle 1404.

In some embodiments, the air jet can be used with the assist gas. The assist gas can optimize the liquid jet laminar flow length, such as increasing the stability of the liquid jet flow, resulting in a longer stable liquid jet. The assist gas can surround the liquid jet, and can be prepared in a same cavity area and can exit at a same opening. The air jet can prepare the object surface, such as clearing any accumulated liquid from the surface. The air jet can also surround the liquid jet (and the assist gas), and can be prepared in a separate area for exiting the coupling unit at different openings for minimum interference.

Figure 15:
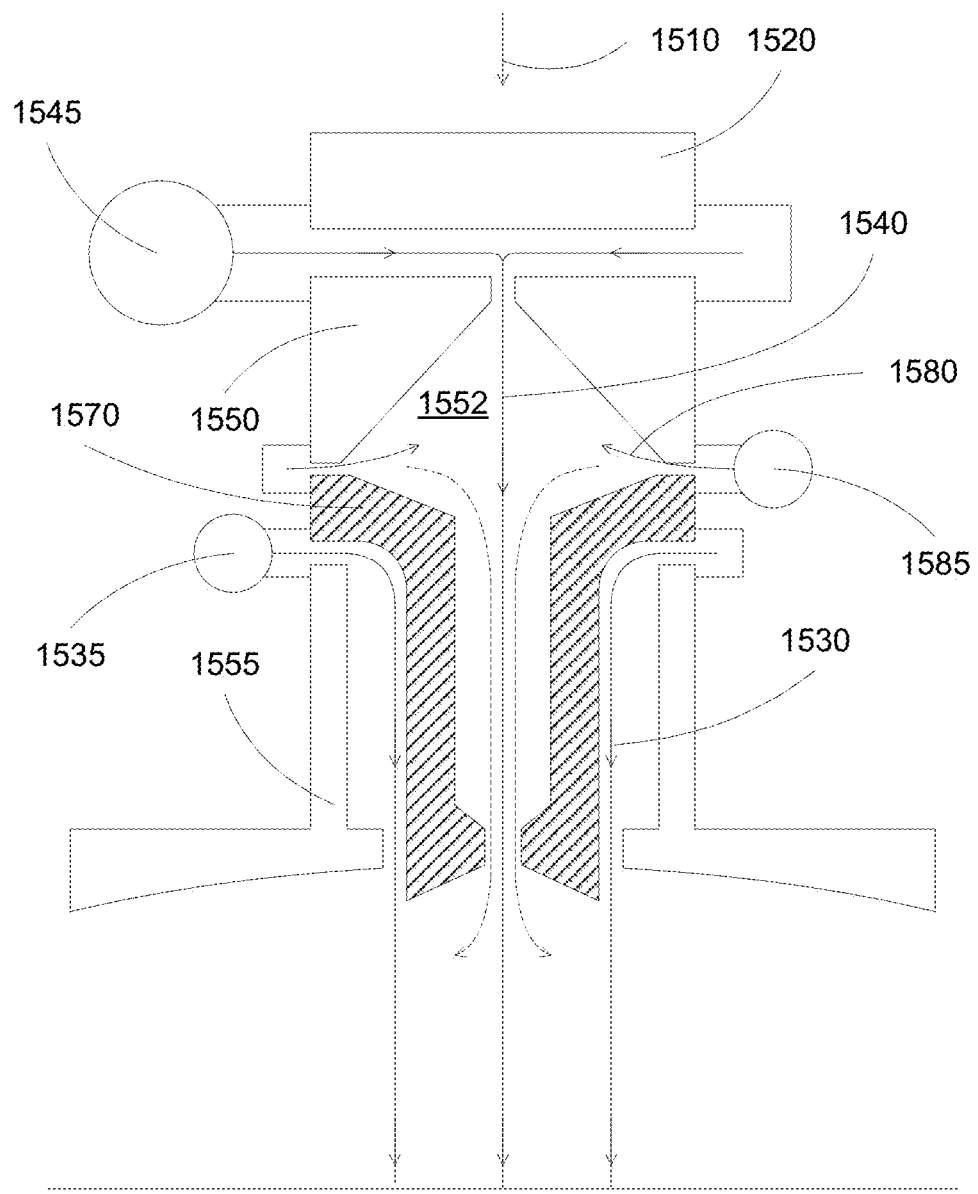
FIG. 15 illustrates a schematic of a coupling unit for liquid jet guided laser processing according to some embodiments.

FIG. 15 illustrates a schematic of a coupling unit for liquid jet guided laser processing according to some embodiments. A transparent window 1520 can be used to separate the dry portion of a laser beam 1510 and the liquid portion of a liquid jet 1540. A lens (not shown) can be used to focus the laser beam 1510 onto the liquid jet. A nozzle 1550 can be coupled to the window 1520, leaving a small gap for accepting a liquid, such as water, from a liquid source 1545. The nozzle has a opening in the middle for the liquid to exit as a liquid jet 1540. The nozzle is open at an opposite end to form a cavity 1552, which can improve the laminar flow of the liquid jet 1540.

An assist gas flow 1580 can be introduced to the cavity 1552, for example, from a gas source 1585. The assist gas flow 1580 can flow toward the liquid jet, and then envelop the liquid jet toward the exit. The assist gas can be adjusted, e.g., having lower pressure and/or flow, to provide an active vacuum compensation in the cavity. A vacuum can be built up by the liquid-jet pressure in the cavity 1552, which can affect the liquid jet operation, such as causing instability to the liquid jet.

An air jet nozzle 1570 can be coupled to the coupling unit, for example, closing the cavity 1555 and guiding the liquid jet 1540 to the exit. The air jet nozzle 1570 can be shaped at the outside to accept a air jet 1530 from a gas source 1535. The air jet nozzle can surround the liquid jet, and accept the air jet 1530 in a parallel direction. Thus the air jet nozzle can be configured to provide a parallel and surrounding air jet 1530 with respect to the liquid jet 1540. The air jet nozzle can form a solid partition between the air jet 1530 and the liquid jet 1540, e.g., the liquid jet and the air jet exit the coupling unit at two separate nozzle openings. The air jet nozzle can provide a solid separation, which can allow for the independent control of the air jet, e.g., controlling the pressure and flow rate to achieve an optimum surface clearing process while not interfering with the liquid jet operation.

As shown, the air jet nozzle 1570 has a parallel outer surface to provide a parallel air jet, e.g., air jet running in a parallel direction as the liquid jet. Other configurations can be used, such as divergent or convergent outer surfaces to provide diverged or converged air jet, e.g., air jet running in a same direction, but not parallel, as the liquid jet.

FIGS. 16A-16B illustrate flow charts for operating a liquid jet guided laser beam using a air jet according to some embodiments. In FIG. 16A, operation 1600 flows a liquid to a coupling unit to form a liquid jet. Operation 1610 focuses a laser beam onto the liquid jet, forming a liquid jet guided laser beam. Operation 1620 forms a gas flow running in the same direction such as parallel to the liquid jet. The gas flow is separate from the liquid jet by a solid partition. The gas flow is configured to clear a surface that the liquid jet is to be contacted. In some embodiments, the gas flow is configured to be surrounding the liquid jet, in a same flow direction as the liquid jet.

In FIG. 16B, operation 1630 provides an air jet nozzle to a coupling unit, wherein the coupling unit is operable for forming a liquid jet. Operation 1640 forms a laser beam guided by the liquid jet. Operation 1650 forms a gas flow running in the same direction such as parallel to the liquid jet. The gas flow is separate from the liquid jet by the air jet nozzle.

In some embodiments, the present invention discloses methods to keep a work piece surface free from liquid accumulation while performing liquid-jet guided laser based material processing. The methods can use a concentric air jet column around the liquid-jet. The air jet can be guided concentrically in the same direction as the liquid-jet by a flow mechanism that mechanically separates the air jet from the liquid-jet. The liquid-jet and the air jet leave the coupling unit through a separate exit. Both the separation and flow direction between the air jet column and the liquid-jet remain intact also outside the coupling unit while being directed to the work piece. The pressure of the air jet can be independently controlled and adjustable, e.g., depending on the shapes of work piece. Any gas can be used as the air jet, such as air or clean dry air. The air jet can be operable to reduce of the dynamic friction between the liquid jet, such as water, and the ambient gas, such as air. The air jet can be configured to provide protection liquid accumulated from liquid mist to fall into the liquid jet.

In some embodiments, the present invention discloses apparatuses to keep a work piece surface free from liquid accumulation while performing liquid-jet guided laser based material processing. The apparatuses can include an air jet mechanism, which can include an interchangeable air jet nozzle that is located below the nozzle. The interchangeable air jet nozzle can allow variable lengths of the flow mechanism to fit individual work piece processing requirements.

The mechanical flow mechanism can be configured to guide the air jet and to separate it from the liquid-jet. The mechanical flow mechanism can contain one or multiple venting holes, which connect the nozzle chamber with the air jet flow, so that the vacuum that would build up by the liquid-jet pressure below the nozzle inside the coupling unit, can be compensated by the available air jet, which is pulled towards the nozzle by the vacuum.

In some embodiments, the shape of the exit side of both the coupling unit counter screw as well as the air jet mechanism is convex or conical in order to guide cumulated liquid mist drops away from the center drilled hole and therewith away from the liquid-jet.

In some embodiments, the cavity in the coupling unit can form a vacuum below the opening that the liquid flows into to form the liquid jet. The vacuum can affect the liquid jet operation, such as causing instability to the liquid jet. To avoid the creation of a vacuum below the nozzle, the cavity can be provided with pathways to an outside ambient for equilibrate the pressure. For example, the air jet nozzle can contain multiple vertically oriented small drilled holes on the top side of the part, which connect the nozzle cavity with the air jet. The direction of the small drilled holes can be under an angle between −45° to +45° in respect to the normal of the air jet nozzle, so that the air jet is not actively guided into the nozzle chamber, but merely functions as an opening through which the nozzle chamber can pull new gas by the liquid-jet generated vacuum.

Figure 17A:
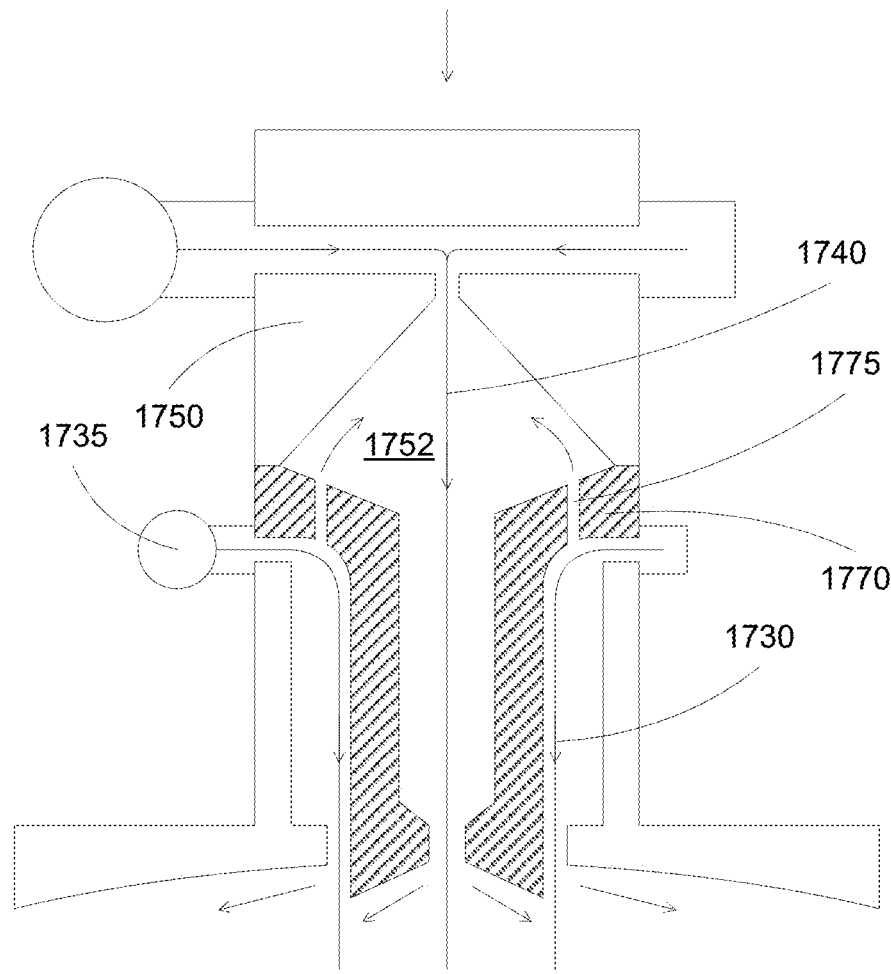
FIGS. 17A-17B illustrate a schematic of another coupling unit for liquid jet guided laser processing according to some embodiments.
Figure 17B:
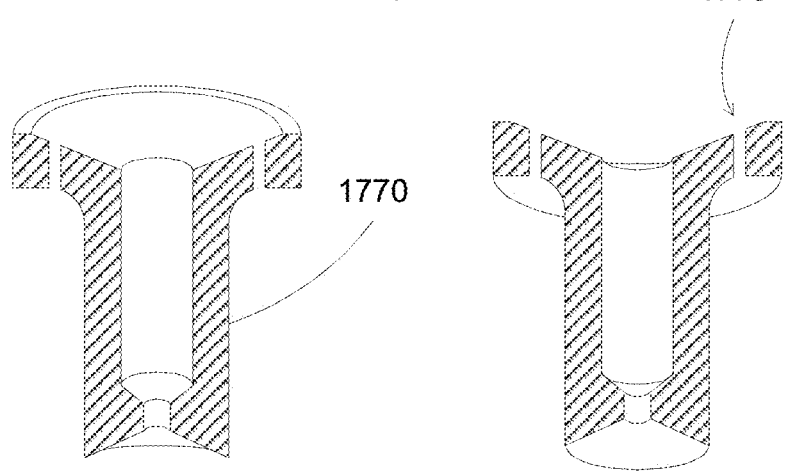

FIGS. 17A-17B illustrate a schematic of another coupling unit for liquid jet guided laser processing according to some embodiments. FIG. 17A shows a cross section of the coupling unit, and FIG. 17B shows perspective views of the air jet nozzle 1770 in the coupling unit. A transparent window can be used to separate the dry portion of a laser beam and the liquid portion of a liquid jet 1740. A nozzle 1750 can be coupled to the window 1720, leaving a small gap for accepting a liquid from a liquid source. The nozzle has a opening in the middle for the liquid to exit as a liquid jet 1740. The nozzle is open at an opposite end to form a cavity 1752, which can improve the laminar flow of the liquid jet 1740.

An air jet nozzle 1770 can be coupled to the nozzle, for example, closing the cavity 1752 and guiding the liquid jet 1740 to the exit. The air jet nozzle 1770 can be shaped at the outside to accept a air jet 1730 from a gas source 1735. The air jet nozzle can surround the liquid jet, and accept the air jet 1730 in a parallel direction. The air jet nozzle 1770 can have one or more small holes 1775, which connect the cavity area 1752 with the air jet 1730. The holes 1775 can equalize the pressure in the cavity area with the outside pressure, thus can reduce or eliminate any vacuum creation in the cavity area.

As shown, the air jet nozzle 1770 has a parallel outer surface to provide a parallel air jet, e.g., air jet running in a parallel direction as the liquid jet. Other configurations can be used, such as divergent or convergent outer surfaces to provide diverged or converged air jet, e.g., air jet running in a same direction, but not parallel, as the liquid jet.

Figure 18:
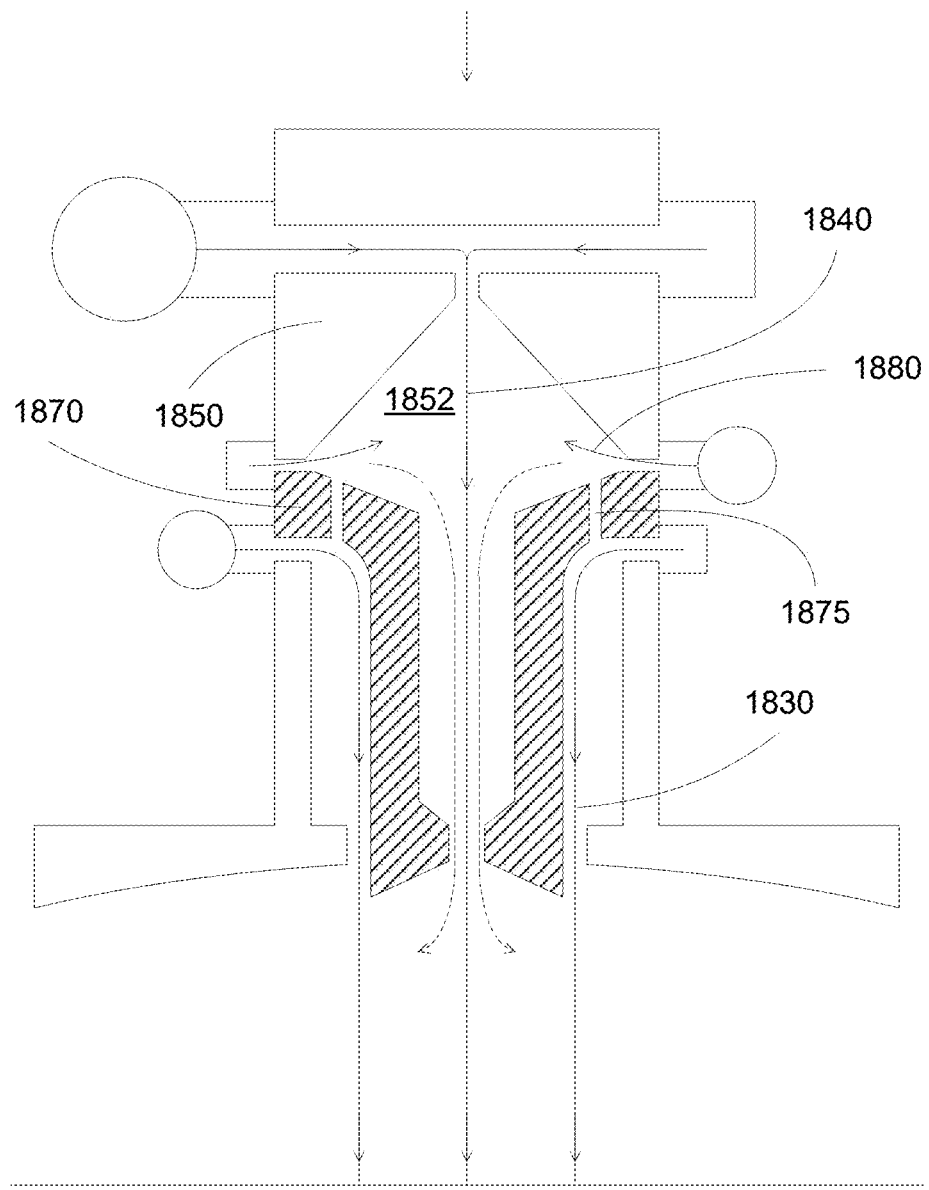
FIG. 18 illustrates a schematic of another coupling unit for liquid jet guided laser processing according to some embodiments.

FIG. 18 illustrates a schematic of another coupling unit for liquid jet guided laser processing according to some embodiments. A transparent window can be used to separate the dry portion of a laser beam and the liquid portion of a liquid jet 1840. A nozzle 1850 can be coupled to the window 1820, leaving a small gap for accepting a liquid from a liquid source. The nozzle has a opening in the middle for the liquid to exit as a liquid jet 1840. The nozzle is open at an opposite end to form a cavity 1852, which can improve the laminar flow of the liquid jet 1840.

An assist gas flow 1880 can be introduced to the cavity 1852, for example, from a gas source. The assist gas flow 1880 can flow toward the liquid jet, and then envelop the liquid jet toward the exit. The assist gas can be adjusted, e.g., having lower pressure and/or flow, to provide an active vacuum compensation in the cavity. A vacuum can be built up by the liquid-jet pressure in the cavity 1852, which can affect the liquid jet operation, such as causing instability to the liquid jet.

An air jet nozzle 1870 can be coupled to the nozzle, for example, closing the cavity 1855 and guiding the liquid jet 1840 to the exit. The air jet nozzle can surround the liquid jet, and accept the air jet 1830 in the same direction such as a parallel direction. Thus the air jet nozzle can be configured to provide a parallel and surrounding air jet 1830 with respect to the liquid jet 1840. The air jet nozzle 1870 can have one or more small holes 1875, which connect the cavity area 1852 with the air jet 1830. The holes 1875 can equalize the pressure in the cavity area with the outside pressure, thus can reduce or eliminate any vacuum creation in the cavity area.

As shown, the air jet nozzle 1870 has a parallel outer surface to provide a parallel air jet, e.g., air jet running in a parallel direction as the liquid jet. Other configurations can be used, such as divergent or convergent outer surfaces to provide diverged or converged air jet, e.g., air jet running in a same direction, but not parallel, as the liquid jet.

FIGS. 19A-19B illustrate flow charts for operating a liquid jet guided laser system according to some embodiments. In FIG. 19A, operation 1900 flows a liquid to a cavity area. The liquid exits from the cavity in a form of a liquid jet. The liquid jet contains a laser beam. Operation 1910 equalizes the pressure in the cavity by a fluid passage way between the cavity and a gas flow pathway.

In FIG. 19B, operation 1930 provides an air jet nozzle to a coupling unit. The coupling unit is operable for forming a liquid jet. Operation 1940 forms a laser beam guided by the liquid jet. Operation 1950 forms a gas flow running in the same direction such as parallel to the liquid jet. The gas flow is separate from the liquid jet by the air jet nozzle. Operation 1960 equalizes the pressure in the coupling unit by a fluid passage way between the coupling unit and the gas flow pathway.

What is claimed is:
1. A liquid jet guided laser system comprising
a laser for emitting a laser beam;
a nozzle module,
    wherein the nozzle module is configured to be connected to a liquid supply line for forming a liquid jet;
an optical element for coupling the laser beam into the liquid jet;
an air jet module,
    wherein the air jet module is coupled to the nozzle module,
    wherein the air jet module comprises an inner wall and an outer wall, wherein the inner wall forms a first conduit for accepting the liquid jet to pass through,
wherein the inner wall and outer wall form a second conduit completely surrounding the first conduit,
wherein the outer wall comprises a gas inlet for connecting to a gas supply line for forming a gas flow through the second conduit,
wherein the gas flow passing through the air jet module surrounds the liquid jet,
wherein the air jet and the liquid jet are configured to be guided toward a workpiece,
wherein the inner wall is configured so that the gas flow is diverged from the liquid jet.

2. A system as in claim 1
wherein the diverged angle is less than 30 degrees.

3. A system as in claim 1
wherein the inner wall comprises at least a hole to provide fluid communication between the first conduit and the second conduit for vacuum compensation.

4. A system as in claim 1
wherein one end of the inner wall is tapered outward away from the liquid jet at an exit opening of the nozzle module.

5. A system as in claim 1
wherein one end of the outer wall is tapered outward away from the liquid jet at an exit opening of the nozzle module.

6. A system as in claim 1
wherein the inner wall is longer than the outer wall.

7. A system as in claim 1
wherein the inner wall comprises an inlet for accepting an assist gas flow.

8. A system as in claim 1
wherein the gas supply line comprises a compressed gas with a pressure less than 10 bar.

9. A system as in claim 1
wherein the gas supply line comprises a compressed gas with a maximum pressure of 10 bar.

10. A liquid jet guided laser system comprising
a laser for emitting a laser beam;
a nozzle for forming a liquid jet from a liquid supply;
an optical element for coupling the laser beam into the liquid jet;
an air jet holder,
wherein the air jet holder is coupled to the nozzle,
wherein the air jet holder comprises a gas inlet for connecting to a gas supply line to form a gas flow,
an air jet nozzle,
wherein the air jet nozzle is disposed inside the air jet holder,
wherein the air jet nozzle is configured to allow the liquid jet to pass through,
wherein the air jet nozzle is configured to physically separate the gas flow from the liquid jet, and
wherein the air jet nozzle comprises a fluid communication path between the gas flow and the liquid jet.

11. A system as in claim 10
wherein the air jet nozzle is configured so that the gas flow is substantially parallel with the liquid jet.

12. A system as in claim 10
wherein the air jet nozzle is configured so that the gas flow is diverged from the liquid jet.

13. A system as in claim 10
wherein the air jet nozzle comprises at least one hole to provide fluid communication.

14. A system as in claim 10
wherein the gas supply line comprises a compressed gas with a pressure less than 10 bar.

15. A system as in claim 1, further comprising:
wherein the gas flow passing through the air jet module completely surrounding the liquid jet forms a concentric flow, and
wherein the concentric flow is radially symmetrical from the liquid jet.

16. A system as in claim 1, further comprising:
wherein the air jet operates at a predetermined pressure and a negative angle when a workpiece surface is positioned at a predetermined distance, and
wherein the air jet operates at a higher pressure and a positive angle when the workpiece surface is positioned farther than the predetermined distance.

17. A system as in claim 1, further comprising:
a separator configured to separate the liquid jet and the air jet at least a beginning portion of the liquid jet and the air jet.

18. A system as in claim 10, further comprising:
wherein a bottom portion of the air jet nozzle is tapered outward away from the liquid jet.

19. A system as in claim 10, further comprising:
wherein a bottom portion of the air jet holder is tapered outward to guide liquid droplets away from the liquid jet.

20. A system as in claim 1
wherein the inner wall is configured so that the gas flow is instead substantially parallel with the liquid jet.

* * * * *